United States Patent
Kies et al.

(10) Patent No.: US 12,229,918 B2
(45) Date of Patent: Feb. 18, 2025

(54) ELECTRONIC DEVICE FOR SHARPENING IMAGE AND OPERATION METHOD THEREOF

(71) Applicant: SAMSUNG ELECTRONICS CO., LTD., Suwon-si (KR)

(72) Inventors: Pawel Kies, Warsaw (PL); Radoslaw Chmielewski, Warsaw (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 281 days.

(21) Appl. No.: 17/748,723

(22) Filed: May 19, 2022

(65) Prior Publication Data

US 2023/0069998 A1    Mar. 9, 2023

Related U.S. Application Data

(63) Continuation of application No. PCT/KR2022/006038, filed on Apr. 27, 2022.

(30) Foreign Application Priority Data

Sep. 7, 2021  (KR) .......................... 10-2021-0119214

(51) Int. Cl.
  *G06T 5/20*   (2006.01)
  *G06T 5/73*   (2024.01)
  *H04N 23/80*  (2023.01)

(52) U.S. Cl.
  CPC ............. *G06T 5/20* (2013.01); *G06T 5/73* (2024.01); *H04N 23/80* (2023.01)

(58) Field of Classification Search
  CPC . G06T 5/20; G06T 5/73; H04N 23/80; H04N 23/683
  See application file for complete search history.

(56) References Cited

U.S. PATENT DOCUMENTS 8,306,348 B2   11/2012   Cohen et al.
8,339,481 B2   12/2012   Kim et al.
(Continued)

FOREIGN PATENT DOCUMENTS

KR      10-1313911 B1     10/2013
KR   10-2019-0089922 A     7/2019
(Continued)

OTHER PUBLICATIONS

International Search Report (PCT/ISA/220 and PCT/ISA/210) and Written Opinion (PCT/ISA/237) issued Aug. 5, 2022 by the International Searching Authority in International Application No. PCT/KR2022/006038.

(Continued)

*Primary Examiner* — Ping Y Hsieh
*Assistant Examiner* — Vaisali Rao Koppolu
(74) *Attorney, Agent, or Firm* — Sughrue Mion, PLLC

(57) ABSTRACT

Provided are an electronic device for sharpening an image and an operation method thereof. A method, performed by the electronic device, of sharpening an image includes: obtaining an image generated by a camera of the electronic device; obtaining a first sharpening kernel for enhancing sharpness of the image, wherein the first sharpening kernel is data including a plurality of weights to be applied to pixels in the image, the data being of a lower resolution than the image; determining coordinates corresponding to some weights indicating representative values of the first sharpening kernel from among the plurality of weights in the first sharpening kernel; generating a second sharpening kernel by selecting the weights corresponding to the determined coordinates; and obtaining a sharpened image by applying the second sharpening kernel to the image.

20 Claims, 20 Drawing Sheets

(56) References Cited

U.S. PATENT DOCUMENTS

| | | |
|---|---|---|
| 8,588,544 B2 | 11/2013 | Lei et al. |
| 8,718,394 B2 | 5/2014 | Vandame |
| 9,165,350 B2 | 10/2015 | Chang et al. |
| 9,445,007 B1 | 9/2016 | Li et al. |
| 9,489,719 B2 | 11/2016 | Naruse et al. |
| 9,633,417 B2 | 4/2017 | Sugimoto et al. |
| 10,282,822 B2 | 5/2019 | Shmunk et al. |
| 10,964,026 B2 | 3/2021 | Zhao et al. |
| 10,991,074 B2 | 4/2021 | Bousmalis et al. |
| 11,030,724 B2 | 6/2021 | Cho et al. |
| 2010/0303376 A1 | 12/2010 | Chen et al. |
| 2011/0311154 A1 | 12/2011 | Vandame |
| 2015/0078677 A1 | 3/2015 | Chang et al. |
| 2016/0080711 A1* | 3/2016 | Oniki ................ H04N 9/646 348/242 |
| 2016/0171667 A1* | 6/2016 | Tezaur ................ G06T 5/20 382/275 |
| 2016/0248984 A1 | 8/2016 | Li et al. |
| 2016/0335747 A1* | 11/2016 | Yang ................ G06T 5/10 |
| 2017/0004603 A1* | 1/2017 | Irie ................ G06T 5/20 |
| 2017/0053380 A1* | 2/2017 | McNally ................ G06T 7/60 |
| 2017/0365046 A1* | 12/2017 | Tezaur ................ G06T 5/20 |
| 2020/0218936 A1 | 7/2020 | Yadav et al. |
| 2021/0117768 A1 | 4/2021 | Liu et al. |
| 2021/0183015 A1* | 6/2021 | Ahn ................ G06N 3/045 |

FOREIGN PATENT DOCUMENTS

| | | |
|---|---|---|
| KR | 10-2020-0030988 A | 3/2020 |
| KR | 10-2020-0031012 A | 3/2020 |
| KR | 10-2020-0084808 A | 7/2020 |

OTHER PUBLICATIONS

"Wiener deconvolution", Wikipedia, Jan. 3, 2022, 4 pages total, https://en.wikipedia.org/wiki/Wiener_deconvolution.

"Bilinear interpolation", Wikipedia, Apr. 10, 2022, 4 pages total, https://en.wikipedia.org/wiki/Bilinear_interpolation.

\* cited by examiner

FIG. 7A $|K_h| =$

| 0.029 | 0.0108 | 0.0092 | 0.0303 | 0.0336 | 0.0041 | 0.015 | 0.0042 | 0.0282 | 0.0302 | 0.0059 | 0.0087 | 0.0254 |
| --- | --- | --- | --- | --- | --- | --- | --- | --- | --- | --- | --- | --- |
| 0.0169 | 0.0416 | 0.0414 | 0.0089 | 0.0164 | 0.0186 | 0.0428 | 0.0185 | 0.0116 | 0.0122 | 0.0325 | 0.0343 | 0.0149 |
| 0.0064 | 0.0604 | 0.0463 | 0.0283 | 0.0418 | 0.0049 | 0.0373 | 0.0063 | 0.0334 | 0.0309 | 0.0379 | 0.0542 | 0.0028 |
| 0.0026 | 0.0636 | 0.0214 | 0.0912 | 0.1141 | 0.0438 | 0.0049 | 0.0398 | 0.103 | 0.0971 | 0.0119 | 0.0595 | 0.0075 |
| 0.0142 | 0.0338 | 0.0386 | 0.1812 | 0.1684 | 0.0236 | 0.0672 | 0.0116 | 0.1464 | 0.186 | 0.0528 | 0.0285 | 0.0101 |
| 0.0135 | 0.0305 | 0.0474 | 0.1726 | 0.0579 | 0.2183 | 0.3792 | 0.2389 | 0.0196 | 0.1728 | 0.0671 | 0.0264 | 0.0092 |
| 0.0321 | 0.0835 | 0.0208 | 0.0671 | 0.135 | 0.5177 | 0.7423 | 0.5403 | 0.1809 | 0.0633 | 0.0003 | 0.0816 | 0.0375 |
| 0.0087 | 0.0375 | 0.0376 | 0.1616 | 0.0483 | 0.2186 | 0.373 | 0.2382 | 0.0113 | 0.1622 | 0.0579 | 0.0336 | 0.0045 |
| 0.0187 | 0.0306 | 0.0398 | 0.186 | 0.1858 | 0.0699 | 0.0044 | 0.0614 | 0.1654 | 0.1917 | 0.0548 | 0.0255 | 0.015 |
| 0.0011 | 0.0633 | 0.0271 | 0.0841 | 0.1175 | 0.073 | 0.0459 | 0.0722 | 0.1087 | 0.0912 | 0.0179 | 0.0597 | 0.0058 |
| 0.0067 | 0.0601 | 0.0538 | 0.0125 | 0.0268 | 0.0035 | 0.0196 | 0.0022 | 0.0202 | 0.015 | 0.0466 | 0.0545 | 0.0033 |
| 0.019 | 0.038 | 0.0423 | 0.0021 | 0.0034 | 0.0347 | 0.0506 | 0.0335 | 0.0081 | 0.0001 | 0.0345 | 0.031 | 0.017 |
| 0.0314 | 0.0062 | 0.0057 | 0.0287 | 0.0265 | 0.0019 | 0.0169 | 0.0013 | 0.021 | 0.0278 | 0.0033 | 0.0047 | 0.0274 |

ABSOLUTE VALUES OF 13X13 SHARPENING KERNEL

$$L = \begin{bmatrix} 0 & -1 & 0 \\ -1 & 4 & -1 \\ 0 & -1 & 0 \end{bmatrix}$$

$$\Delta K_h = K_h * L$$

$$|\Delta K_h| =$$

| 0.0137 | 0.0027 | 0.0019 | 0.011 | 0.0105 | 0.0021 | 0.0032 | 0.0028 | 0.0083 | 0.0108 | 0.0016 | 0.0025 | 0.0119 |
| 0.0092 | 0.0089 | 0.0097 | 0.0002 | 8E-06 | 0.0059 | 0.0102 | 0.0051 | 0.0011 | 0.001 | 0.008 | 0.0071 | 0.0082 |
| 0.0089 | 0.012 | 0.0113 | 0.0022 | 0.0017 | 0.0062 | 0.0113 | 0.0053 | 0.0007 | 0.0023 | 0.0105 | 0.011 | 0.0073 |
| 0.0041 | 0.0171 | 0.0132 | 0.0078 | 0.0139 | 0.0059 | 0.0001 | 0.007 | 0.0119 | 0.0101 | 0.0125 | 0.017 | 0.0021 |
| 0.0099 | 0.0117 | 0.0024 | 0.0317 | 0.0371 | 0.0209 | 0.01 | 0.0208 | 0.0332 | 0.0343 | 0.0002 | 0.0114 | 0.0084 |
| 0.0128 | 0.0082 | 0.0037 | 0.0421 | 0.0305 | 0.0072 | 0.0313 | 0.0084 | 0.0224 | 0.0444 | 0.0087 | 0.009 | 0.0113 |
| 0.0084 | 0.0266 | 0.019 | 0.0112 | 0.0245 | 0.0946 | 0.1449 | 0.0951 | 0.0347 | 0.0124 | 0.0135 | 0.0286 | 0.0102 |
| 0.0107 | 0.0103 | 0.0009 | 0.0384 | 0.0249 | 0.0128 | 0.0372 | 0.014 | 0.017 | 0.0406 | 0.006 | 0.0112 | 0.0092 |
| 0.0122 | 0.01 | 0.008 | 0.0341 | 0.0402 | 0.0294 | 0.0267 | 0.0302 | 0.0361 | 0.0367 | 0.0016 | 0.0098 | 0.0108 |
| 0.0042 | 0.0168 | 0.0144 | 0.0059 | 0.0126 | 0.0078 | 0.0085 | 0.0094 | 0.0107 | 0.0084 | 0.0139 | 0.0169 | 0.0023 |
| 0.0086 | 0.0115 | 0.0123 | 0.0006 | 0.002 | 0.0074 | 0.006 | 0.006 | 0.0041 | 0.0006 | 0.0118 | 0.0105 | 0.0071 |
| 0.0095 | 0.0078 | 0.0087 | 0.0005 | 0.0037 | 0.0099 | 0.0122 | 0.009 | 0.005 | 3E-05 | 0.0072 | 0.0059 | 0.0086 |
| 0.0141 | 0.0015 | 0.0004 | 0.012 | 0.0103 | 0.0022 | 0.0017 | 0.003 | 0.0082 | 0.0117 | 0.0002 | 0.0015 | 0.0121 |

ABSOLUTE VALUES OF 13X13 SHARPENING KERNEL TO WHICH HPF IS APPLIED

FIG. 8A

| 13×13 | 6 | 5 | 4 | 3 | 2 | 1 | 0 | -1 | -2 | -3 | -4 | -5 | -6 |
|---|---|---|---|---|---|---|---|---|---|---|---|---|---|
| 6 | -0.025 | 0.0087 | 0.0059 | -0.03 | -0.028 | -0.004 | 0.015 | 0.004 | -0.034 | -0.03 | 0.0092 | 0.0108 | -0.029 |
| 5 | -0.015 | 0.0343 | 0.0325 | -0.012 | -0.012 | 0.0185 | 0.0428 | 0.0186 | -0.016 | -0.009 | 0.0414 | 0.0416 | -0.017 |
| 4 | -0.003 | 0.0542 | 0.0379 | -0.031 | -0.033 | 0.0063 | 0.0373 | 0.0049 | -0.042 | -0.028 | 0.0463 | 0.0604 | -0.006 |
| 3 | 0.0075 | 0.0596 | 0.0119 | -0.097 | -0.103 | -0.04 | 0.0049 | -0.044 | -0.114 | -0.091 | 0.0214 | 0.0636 | 0.0026 |
| 2 | -0.01 | 0.0285 | -0.053 | 0.186 | -0.146 | -0.012 | 0.0672 | -0.024 | -0.168 | -0.181 | -0.039 | 0.0338 | -0.014 |
| 1 | -0.009 | 0.0264 | -0.067 | -0.173 | -0.02 | 0.2389 | 0.3792 | 0.2183 | -0.058 | -0.173 | -0.047 | 0.0305 | -0.014 |
| 0 | 0.0375 | 0.0816 | 0.0003 | -0.063 | 0.1809 | 0.5403 | 0.7423 | 0.5177 | 0.135 | -0.067 | 0.0208 | 0.0835 | 0.0321 |
| -1 | -0.004 | 0.0336 | -0.058 | -0.162 | -0.011 | 0.2382 | 0.373 | 0.2186 | -0.048 | -0.162 | -0.038 | 0.0375 | -0.009 |
| -2 | -0.015 | 0.0255 | -0.055 | -0.192 | -0.165 | -0.061 | -0.004 | -0.07 | -0.186 | -0.186 | -0.04 | 0.0306 | -0.019 |
| -3 | 0.0058 | 0.0597 | 0.0179 | -0.091 | -0.109 | -0.072 | -0.016 | -0.073 | -0.118 | -0.084 | 0.0271 | 0.0633 | 0.0011 |
| -4 | -0.003 | 0.0545 | 0.0466 | -0.015 | -0.02 | 0.0022 | 0.0196 | 0.0035 | -0.027 | -0.013 | 0.0538 | 0.0601 | -0.007 |
| -5 | -0.017 | 0.031 | 0.0345 | 1E-04 | 0.0081 | 0.0335 | 0.0506 | 0.0347 | 0.0034 | 0.0021 | 0.0423 | 0.038 | -0.019 |
| -6 | -0.027 | 0.0047 | 0.0033 | -0.028 | -0.021 | 0.0013 | 0.0169 | 0.0019 | -0.027 | -0.029 | 0.0057 | 0.0062 | -0.031 |

1 maximum –
4 minimums –

FIG. 14

| -0.029 | 0.0092 | -0.034 | 0.015 | -0.028 | 0.0059 | -0.025 |
| --- | --- | --- | --- | --- | --- | --- |
| -0.006 | 0.0463 | -0.042 | 0.0373 | -0.033 | 0.0379 | -0.003 |
| -0.014 | -0.039 -0.168<br>(-1.5, 1.0) | 0.0672 | -0.146 -0.053<br>(1.5, 1.0) | -0.01 |
| 0.0321 | 0.0208 | 0.135 | 0.7423 | 0.1809 | 0.0003 | 0.0375 |
| -0.019 | -0.04 -0.186<br>(-1.5, -1.0) | -0.004 | -0.165 -0.055<br>(1.5, -1.0) | -0.015 |
| -0.007 | 0.0538 | -0.027 | 0.0196 | -0.02 | 0.0466 | -0.003 |
| -0.031 | 0.0057 | -0.027 | 0.0169 | -0.021 | 0.0033 | -0.027 |

FIRST SHARPENING KERNEL 1410

⇒ DETERMINING REPRESENTATIVE VALUES OF FIRST SHARPENING KERNEL

Second sharpening kernel 1420 contains:
- 1422: -0.181
- 1424: -0.186
- 1426: -0.186
- 1428: -0.192
- center: 0.7423

SECOND SHARPENING KERNEL 1420

ELECTRONIC DEVICE FOR SHARPENING IMAGE AND OPERATION METHOD THEREOF

CROSS-REFERENCE TO RELATED APPLICATION(S)

This application is a bypass continuation of International Application No. PCT/KR2022/006038, filed on Apr. 27, 2022, which is based on and claims priority to Korean Patent Application No. 10-20210119214, filed on Sep. 7, 2021, in the Korean Intellectual Property Office, the disclosures of which are incorporated by reference herein in their entireties.

BACKGROUND

1. Field

The disclosure relates to an electronic device for sharpening an image by using a sharpening kernel and an operation method thereof are provided.

2. Description of Related Art

A technique for sharpening an image by using a sharpening kernel based on estimation of a point spread function (PSF) has been used as an image processing method performed by an electronic device to remove blur from an image. The electronic device may use an image restoration technique for generating a sharp image by generating a sharpening kernel and performing a convolution operation between the sharpening kernel and the image.

When the electronic device performs a convolution operation for image sharpening, the number of computations required for image restoration may increase with an increase in a size of the sharpening kernel.

SUMMARY

Embodiments of the disclosure provide an electronic device for sharpening an image and an operation method thereof.

As an image sharpening method performed by an electronic device according to embodiments, the disclosure presents a method of sharpening an image via a reduced number of computations by reducing the number of weights in the sharpening kernel.

According to an aspect of the disclosure, there is provided a method, performed by an electronic device, of sharpening an image, the method including: obtaining an image by a camera of the electronic device; obtaining a first sharpening kernel for enhancing sharpness of the image, wherein the first sharpening kernel is data including a plurality of weights to be applied to pixels in the image, and the data is of a lower resolution than the image; determining coordinates corresponding to weights indicating representative values of the first sharpening kernel from among the plurality of weights in the first sharpening kernel; generating a second sharpening kernel by selecting the weights corresponding to the determined coordinates; and obtaining a sharpened image by applying the second sharpening kernel to the image.

According to an aspect of the disclosure, there is provided an electronic device for sharpening an image, the electronic device including: a communication interface; a camera; a memory storing one or more instructions; and at least one processor configured to execute the one or more instructions stored in the memory to: obtain an image generated by the camera, obtain a first sharpening kernel for enhancing sharpness of the image, wherein the first sharpening kernel is data including a plurality of weights to be applied to pixels in the image, and the data is of a lower resolution than the image, determine coordinates corresponding to weights indicating representative values of the first sharpening kernel from among the plurality of weights in the first sharpening kernel, generate a second sharpening kernel by selecting the weights corresponding to the determined coordinates, and obtain a sharpened image by applying the second sharpening kernel to the image.

According to another embodiment of the disclosure, a non-transitory computer-readable recording medium having record thereon a program that is executable by at least one process to perform the method according to the embodiment of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7A is a diagram for further describing FIG. 6 and illustrates an example of taking absolute values of a first sharpening kernel;

FIG. 7B is a diagram for further describing FIG. 6 and illustrates an example of taking absolute values of a first sharpening kernel to which a high pass filter (HPF) is applied;

FIG. 8A is a diagram for describing a method, performed by an electronic device, of generating a second sharpening kernel that is lightweight by determining coordinates corresponding to some weights indicating representative values of a first sharpening kernel, according to an embodiment of the disclosure;

FIG. 14 is a diagram for further describing the method of FIG. 13, and is a diagram for describing an example in which one or more new weights are included in some weights indicating representative values of a first sharpening kernel;

FIG. 16 is a block diagram of a configuration of an electronic device according to an embodiment of the disclosure; and.

DETAILED DESCRIPTION

Figure 1:
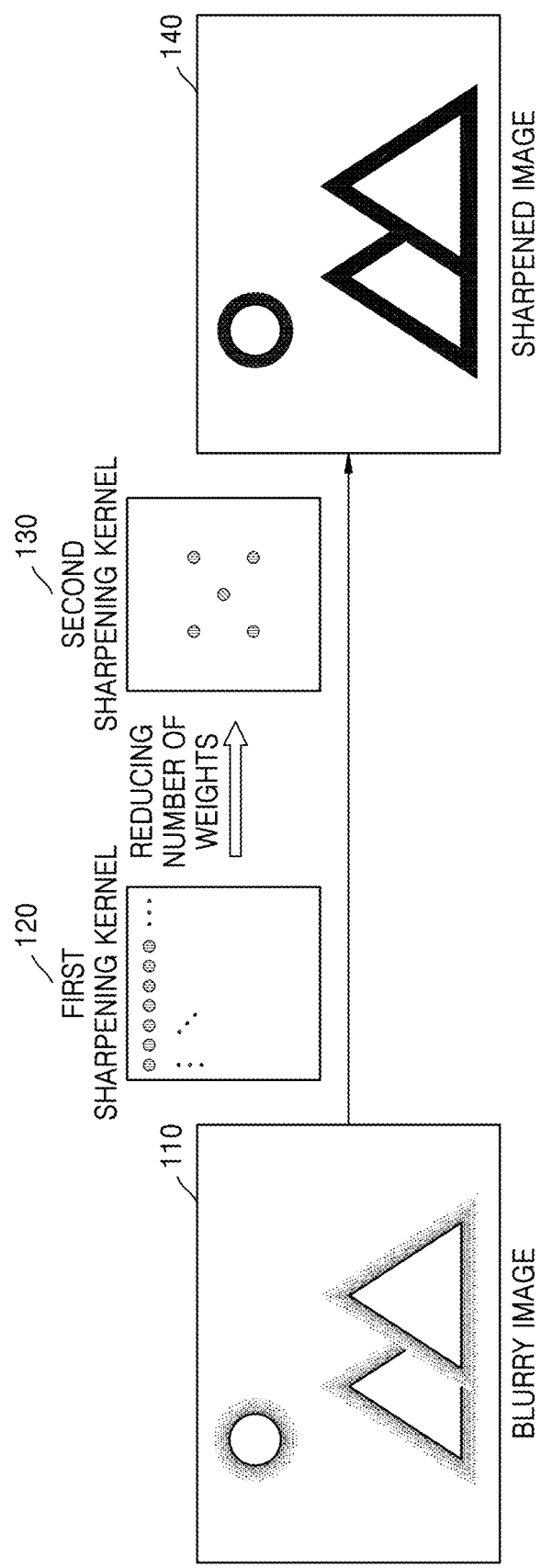
FIG. 1 is a schematic diagram illustrating an operation of an electronic device sharpening an image according to an embodiment of the disclosure.

Throughout the disclosure, the expression "at least one of a, b or c" indicates only a, only b, only c, both a and b, both a and c, both b and c, or all of a, b, and c.

Terms used in the present specification will now be briefly described and then the disclosure will be described in detail.

The terms used in the disclosure are general terms currently widely used in the art based on functions described in the disclosure, but may have different meanings according to an intention of a technician engaged in the art, precedent cases, advent of new technologies, etc. Furthermore, some particular terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the disclosure.

Singular expressions used herein are intended to include plural expressions as well unless the context clearly indicates otherwise. All the terms used herein, which include technical or scientific terms, may have the same meaning that is generally understood by a person of ordinary skill in the art. Although the terms including an ordinal number such as "first", "second", etc. may be used herein to describe various elements or components, these elements or components should not be limited by the terms. The terms are only used to distinguish one element or component from another element or component.

Throughout the specification, when a part "includes" or "comprises" an element, unless there is a particular description contrary thereto, it is understood that the part may further include other elements, not excluding the other elements. Furthermore, terms such as "portion," "module," etc. used herein indicate a unit for processing at least one function or operation and may be implemented as hardware or software or a combination of hardware and software.

Embodiments of the disclosure will now be described more fully hereinafter with reference to the accompanying drawings so that they may be easily implemented by one of ordinary skill in the art. However, the disclosure may be implemented in different forms and should not be construed as being limited to the embodiments set forth herein. In addition, parts not related to descriptions of the disclosure are omitted to clearly explain embodiments of the disclosure in the drawings, and like reference numerals denote like elements throughout.

FIG. 1 is a schematic diagram illustrating an operation of an electronic device sharpening an image according to an embodiment of the disclosure.

An electronic device according to an embodiment of the disclosure may obtain an image generated by a camera of the electronic device.

In an embodiment of the disclosure, when the camera of the electronic device includes a diffractive optical element (DOE), etc., the camera of the electronic device may generate a blurry image 110 including blur that occurs due to the DOE. According to an embodiment of the disclosure, the electronic device may obtain a sharpened image 140 by restoring the blurry image 110 via image processing operations.

In an embodiment of the disclosure, the electronic device may generate a sharpening kernel to sharpen the blurry image 110. A sharpening kernel refers to data that is applied to a blurry image to perform a convolution operation and thus obtain a sharpened image. A kernel may also be referred to as a mask or filter. Furthermore, because a process of obtaining a sharpened image by using the sharpening kernel may be referred to as deconvolution, a sharpening kernel may be referred to as a deconvolution kernel. For convenience of description, data used for obtaining a sharpened image will hereinafter be referred to as a sharpening kernel. In detail, the electronic device may generate a first sharpening kernel 120 and a second sharpening kernel 130 for sharpening the blurry image 110.

In an embodiment of the disclosure, the electronic device may estimate a point spread function (PSF) corresponding to characteristics of a camera module of the electronic device, and obtain the first sharpening kernel 120 for sharpening the blurry image 110 based on the PSF. The first sharpening kernel 120 may have different resolutions depending on the characteristics of the camera module of the electronic device. For example, when a size of the PSF corresponding to the characteristics of the camera module of the electronic device increases, an effect of a single pixel may be spread more widely over neighboring pixels, and thus, a size of the first sharpening kernel corresponding thereto may increase. In this case, an increase in the size of a sharpening kernel means an increase in the number of weights included in the sharpening kernel.

To reduce the number of computations that has increased due to an increase in the size of the first sharpening kernel 120, the electronic device may generate the second sharpening kernel 130 by reducing the number of weights in the first sharpening kernel 120. The second sharpening kernel 130 is a sharpening kernel generated by selecting only some of the weights in the first sharpening kernel 120, and may include fewer weights than the first sharpening kernel 120. In addition, the second sharpening kernel 130 may be a kernel generated by selecting weights determined as representative values from among the weights in the first sharpening kernel 120 instead of sampling the weights in the first sharpening kernel with a uniform density.

According to an embodiment of the disclosure, the electronic device may generate the second sharpening kernel 130, and obtain the sharpened image 140 by applying the second sharpening kernel 130 to the blurry image 110 to sharpen the blurry image 110.

Figure 2:
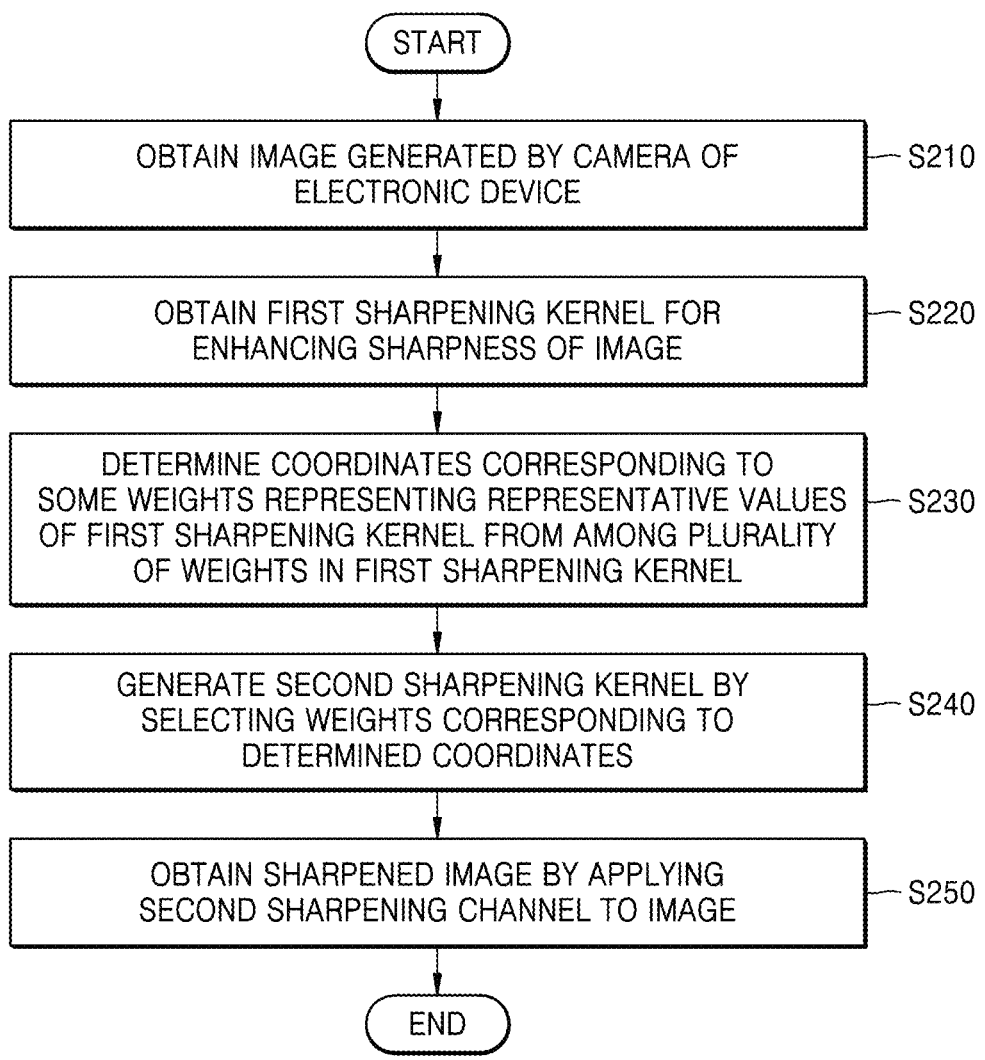
FIG. 2 is a flowchart of a method, performed by an electronic device, of sharpening an image, according to an embodiment of the disclosure.

FIG. 2 is a flowchart of a method, performed by an electronic device, of sharpening an image, according to an embodiment of the disclosure.

According to an embodiment of the disclosure, in operation S210, the electronic device obtains an image generated by a camera of the electronic device.

In an embodiment of the disclosure, the camera of the electronic device may include a camera (e.g., an extended depth of field (EDoF) camera) including a DOE. In this case, the image generated by the camera of the electronic device may be a blurry image including blur that occurs due to the DOE. The blurry image including blur that occurs due to the DOE may be restored via image processing operations to obtain a sharpened image. By restoring the blurry image including blur that occurs due to the DOE, the electronic device may obtain a sharpened image in which both a foreground and a background are in focus. Also, the sharpened image has an EDoF even without focus adjustment.

According to an embodiment of the disclosure, in operation S220, the electronic device obtains a first sharpening kernel for enhancing sharpness of the image. A sharpening kernel refers to data that is applied to a blurry image to perform a convolution operation and thereby obtain a sharpened image. A kernel may also be referred to as a mask or filter. Furthermore, because a process of obtaining a sharpened image by using the sharpening kernel may be referred to as deconvolution, a sharpening kernel may be referred to as a deconvolution kernel. For convenience of description, data used for obtaining a sharpened image will hereinafter be referred to as a sharpening kernel. The electronic device may estimate a PSF representing an output after a point input passes through an optical system, and generate, based on the PSF, a first sharpening kernel that is to be used for restoring a blurry image. The first sharpening kernel will be described below in more detail with reference to FIG. 3.

According to an embodiment of the disclosure, in operation S230, the electronic device determines coordinates corresponding to some weights (In other words, first weights) indicating representative values of the first sharpening kernel from among a plurality of weights in the first sharpening kernel.

In an embodiment of the disclosure, the representative values of the first sharpening kernel may be values indicating feature points of a shape of the first sharpening kernel from among values of a plurality of weights included in the first sharpening kernel. For example, the representative values of the first sharpening kernel may be extreme points or saddle points in the first sharpening kernel.

In an embodiment of the disclosure, representative values of the first sharpening kernel may be determined with a non-uniform density within the first sharpening kernel. For example, the representative values of the first sharpening kernel may be determined with a higher density as a corresponding portion of the first sharpening kernel has a higher curvature so as to reflect feature points where the shape of the first sharpening kernel changes.

According to an embodiment of the disclosure, the electronic device may determine some weights indicating representative values of the first sharpening kernel from among the plurality of weights in the first sharpening kernel. Furthermore, the electronic device may determine coordinates corresponding to the determined weights indicating the representative values.

According to an embodiment of the disclosure, in operation S240, the electronic device may generate a second sharpening kernel by selecting some weights corresponding to the determined coordinates. In an embodiment of the disclosure, the second sharpening kernel may have the same resolution as the first sharpening kernel, and values other than the selected some weights are zero. In other words, the second sharpening kernel may be a lightweight sharpening kernel with fewer effective weights than the first sharpening kernel.

According to an embodiment of the disclosure, in operation S250, the electronic device may obtain a sharpened image by applying the second sharpening kernel to the image.

In an embodiment of the disclosure, the image obtained by the electronic device in operation S210 may be a blurry image. The electronic device may sharpen the blurry image by performing a convolution operation on the blurry image using the second sharpening kernel. According to an embodiment of the disclosure, the electronic device may sharpen the blurry image using the second sharpening kernel, which is a lightweight sharpening kernel, thereby reducing the number of computations compared to when using the first sharpening kernel.

Figure 3:
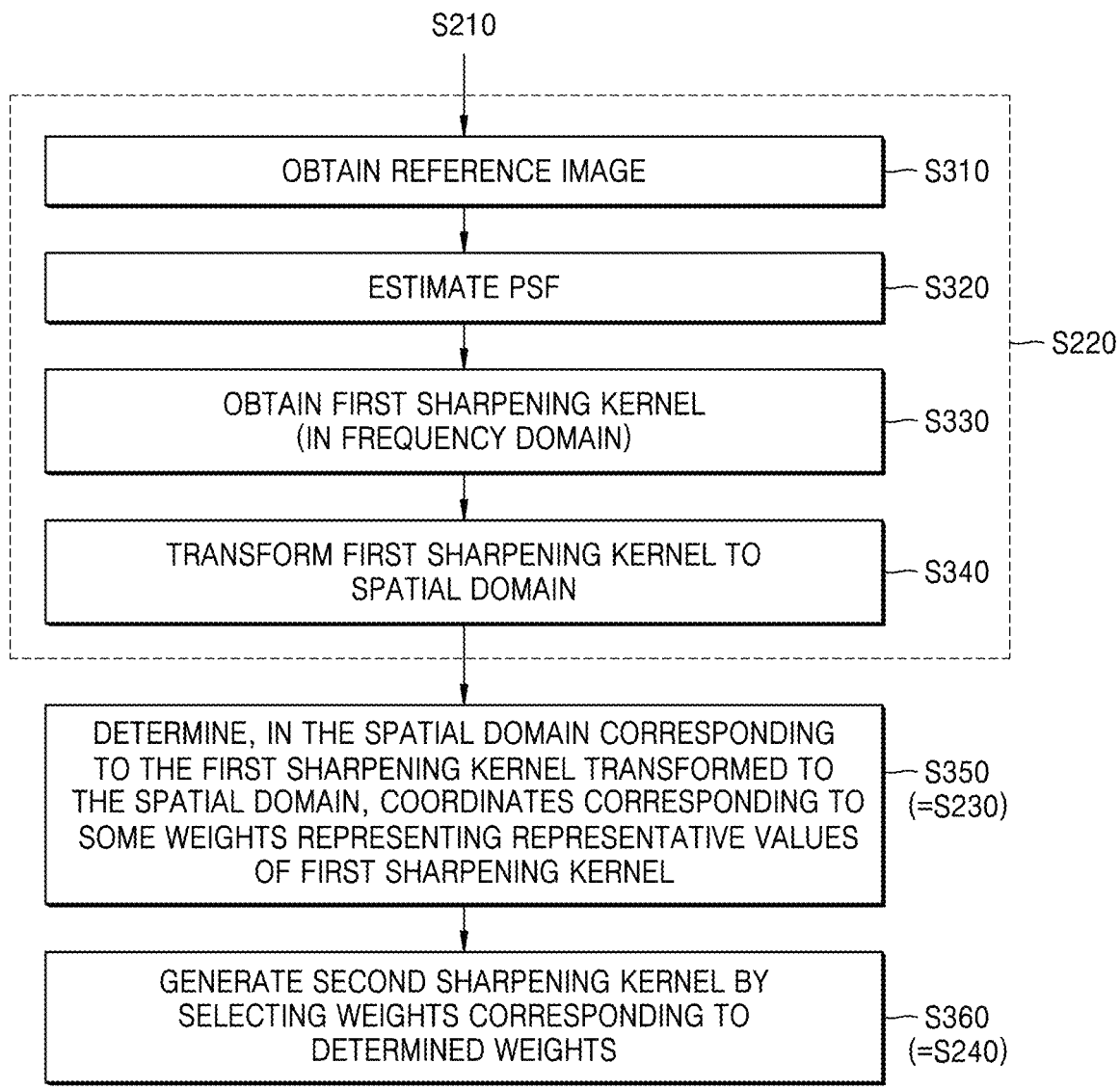
FIG. 3 is a diagram for further describing the method of FIG. 2 and shows a schematic flowchart of a method, performed by an electronic device, of obtaining first and second sharpening kernels, according to an embodiment of the disclosure.

FIG. 3 is a diagram for further describing the method of FIG. 2 and shows a schematic flowchart of a method, performed by an electronic device, of obtaining first and second sharpening kernels, according to an embodiment of the disclosure.

According to an embodiment of the disclosure, in operation S310, the electronic device may obtain a reference image. The reference image may be an image used for estimating a PSF according to optical characteristics of an image sensor, a DOE, etc., included in the camera module of the electronic device. For example, the reference image may be an image obtained by capturing an image of a point light source to obtain an image after a point input passes through an optical system, but is not limited thereto.

According to an embodiment of the disclosure, in operation S320, the electronic device may estimate a PSF based on the reference image. In an embodiment of the disclosure, as each of an image sensor, a lens (e.g., a DOE), etc. in the camera module of the electronic device has different characteristics, a PSF thereof may also be different. The electronic device may estimate a PSF corresponding to the characteristics of the camera module of the electronic device based on a reference image obtained using the camera module of the electronic device. Known techniques may be applied as a method used by the electronic device to estimate the PSF. Because this may be clearly inferred by one of ordinary skill in the art, a detailed description thereof will be omitted.

According to an embodiment of the disclosure, in operation S330, the electronic device may obtain a first sharpening kernel based on the PSF. The electronic device may obtain the first sharpening kernel in a frequency domain based on the PSF transformed to the frequency domain. The first sharpening kernel in the frequency domain obtained by the electronic device may be, for example, a Wiener filter, but embodiments are not limited thereto.

According to an embodiment of the disclosure, in operation S340, the electronic device may obtain the first sharpening kernel in a spatial domain by transforming the first sharpening kernel from the frequency domain to the spatial domain. The first sharpening kernel transformed to the spatial domain may have a certain resolution. For example, the first sharpening kernel may have a resolution of M×N (M and N being integers). In this case, the number of a plurality of weights included in the first sharpening kernel may be M×N. Each of the plurality of weights in the first sharpening kernel transformed to the spatial domain may correspond to a pixel grid so that a convolution operation may be performed between the first sharpening kernel and a blurry image. The electronic device may determine, in the spatial domain corresponding to the first sharpening kernel transformed to the spatial domain, coordinate values of the plurality of weights in the first sharpening kernel. For example, the electronic device may determine as zero point coordinates of a weight corresponding to a center point of the first sharpening kernel transformed to the spatial domain. Operations S310 through S340 may correspond to operation S220 of FIG. 2.

According to an embodiment of the disclosure, in operation S350, the electronic device may determine, in the spatial domain corresponding to the first sharpening kernel transformed to the spatial domain, coordinates of some weights indicating representative values of the first sharpening kernel. Operation S350 may correspond to operation S230 of FIG. 2.

According to an embodiment of the disclosure, in operation S360, the electronic device may generate a second sharpening kernel by selecting the weights corresponding to the determined coordinates. Operation S360 may correspond to operation S240 of FIG. 2.

For convenience of description, in the following descriptions of the disclosure, the first sharpening kernel transformed to the spatial domain is simply referred to as the first sharpening kernel by omitting the term 'spatial domain'.

Figure 4:
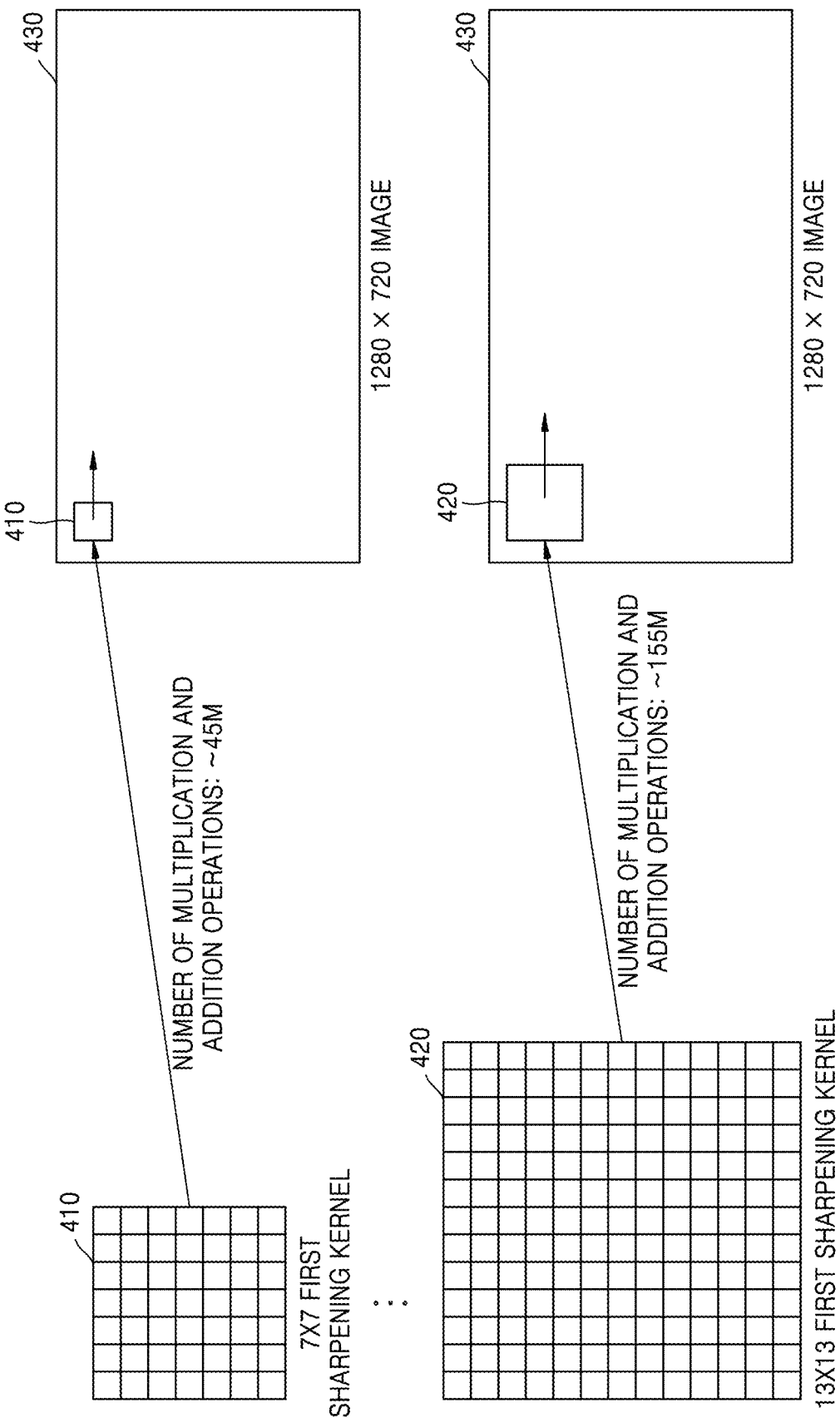
FIG. 4 is a diagram for describing a convolution operation when an electronic device sharpens an image by using a first sharpening kernel, according to an embodiment of the disclosure.

FIG. 4 is a diagram for describing a convolution operation when an electronic device sharpens an image by using a first sharpening kernel, according to an embodiment of the disclosure.

Referring to FIG. 4, according to an embodiment of the disclosure, a first sharpening kernel obtained by the electronic device according to the method described above with reference to FIG. 3 may have a different resolution according to characteristics of the camera module of the electronic device. For example, when the electronic device includes an EDoF camera, an image generated by the electronic device may be a blurry image having a greater degree of blur than an image generated by a general camera. In other words, a PSF estimated by the electronic device may vary according to the characteristics of the camera module of the electronic device. When a size of the PSF increases, an effect of a single pixel may be spread more widely over neighboring pixels, and thus, a size of the first sharpening kernel corresponding thereto may increase.

For example, the first sharpening kernel obtained by the electronic device may be a first sharpening kernel 410 having a size of 7×7. When the electronic device obtains the first sharpening kernel 410 having a size of 7×7, the number of multiplication and addition operations in a convolution operation on a single pixel may be 49. In this case, when the electronic device sharpens an image 430 having a resolution of 1280×720 by using the first sharpening kernel 410 having a size of 7×7, the number of multiplication and addition operations in the entire convolution operation may be 45,158,400.

As another example, the first sharpening kernel obtained by the electronic device may be a first sharpening kernel 420 having a size of 13×13 and with a higher resolution than the first sharpening kernel 410 having a size of 7×7 described above. When the electronic device obtains the first sharpening kernel 420 having a size of 13×13, the number of multiplication and addition operations in a convolution operation on a single pixel may be 169. In this case, when the electronic device sharpens the image 430 having a resolution of 1280×720 by using the first sharpening kernel 420 having a size of 13×13, the number of multiplication and addition operations in the entire convolution operation may be 155,750,400.

As the size of the PSF corresponding to the characteristics of the camera module of the electronic device according to the embodiment of the disclosure increases, the size of the first sharpening kernel obtained by the electronic device to sharpen an image increases, and thus, the number of computations required for the electronic device to sharpen the image also increases. The electronic device may generate a second sharpening kernel by reducing the number of weights in the first sharpening kernel and sharpen an image by using the second sharpening kernel that is lightweight, thereby reducing the number of computations required for the electronic device to sharpen the image.

Figure 5A:
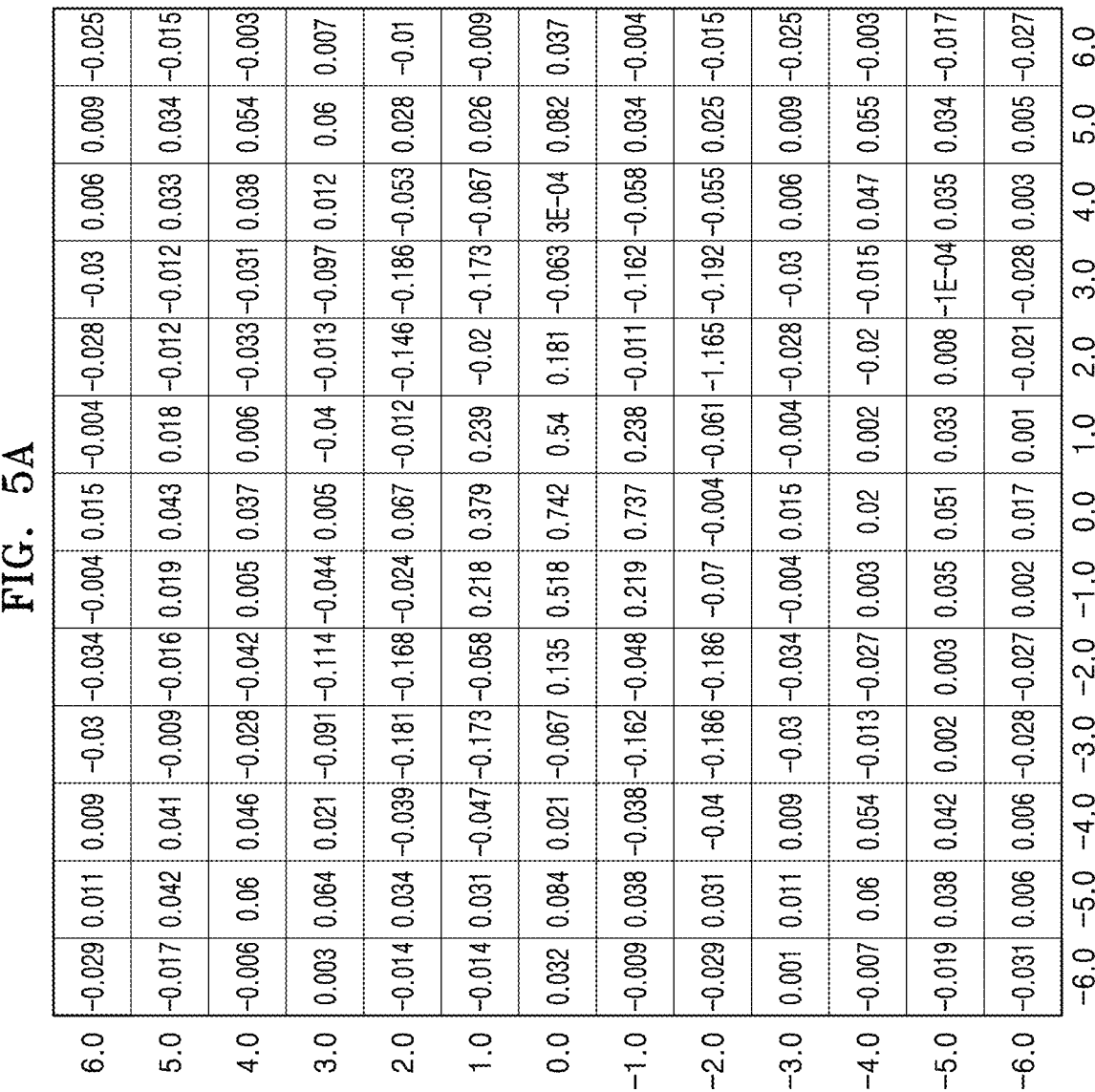
FIG. 5A illustrates an example of a first sharpening kernel obtained by an electronic device, according to an embodiment of the disclosure.

FIG. 5A illustrates an example of a first sharpening kernel obtained by an electronic device, according to an embodiment of the disclosure.

Referring to FIG. 5A, according to an embodiment of the disclosure, the electronic device may obtain a first sharpening kernel 510 according to the above-described embodiments of the disclosure. The first sharpening kernel 510 obtained by the electronic device may have a matrix structure that is of size 13×13. The first sharpening kernel 510 may include a plurality of weights. For example, because the size of the first sharpening kernel 510 is 13×13, the number of the plurality of weights may be 169.

In an embodiment of the disclosure, the electronic device may determine coordinate values of the plurality of weights in the first sharpening kernel 510 within a spatial domain corresponding to the first sharpening kernel 510. For example, the electronic device may determine coordinates of a weight '0.742' corresponding to a center point of the first sharpening kernel 510 as (0,0).

According to an embodiment of the disclosure, the electronic device may determine coordinates corresponding to some weights indicating representative values of the first sharpening kernel 510 from among the plurality of weights in the first sharpening kernel 510.

In an embodiment of the disclosure, the electronic device may determine some weights indicating representative values of the first sharpening kernel 510 from among the plurality of weights in the first sharpening kernel 510. For example, the electronic device may determine some weights located at coordinates (0.0, 0.0), (−3.0, −2.0), (3.0, −2.0), (−3.0, 2.0), and (3.0, 2.0) of the first sharpening kernel 510 as representative values of the first sharpening kernel 510, and determine the coordinates (0.0, 0.0), (−3.0, −2.0), (3.0, −2.0), (−3.0, 2.0), and (3.0, 2.0) as coordinates corresponding to the weights indicating the representative values. This will be described in more detail below with reference to FIGS. 6 through 8B.

In an embodiment of the disclosure, the electronic device may determine some weights indicating representative values of the first sharpening kernel 510 from among values other than the plurality of weights of the first sharpening kernel 510. For example, the electronic device may generate an augmented first sharpening kernel including new weights by performing interpolation between adjacent weights from among the plurality of weights of the first sharpening kernel 510. The electronic device may determine some weights indicating representative values from among weights in the augmented first sharpening kernel including the new weights. In this case, the determined coordinates may be (0.0, 0.0), (−2.5, −2.0), (2.5, −2.0), (−2.5, 2.0), and (2.5, 2.0). This will be described in more detail below with reference to FIGS. 9 through 12.

Figure 5B:
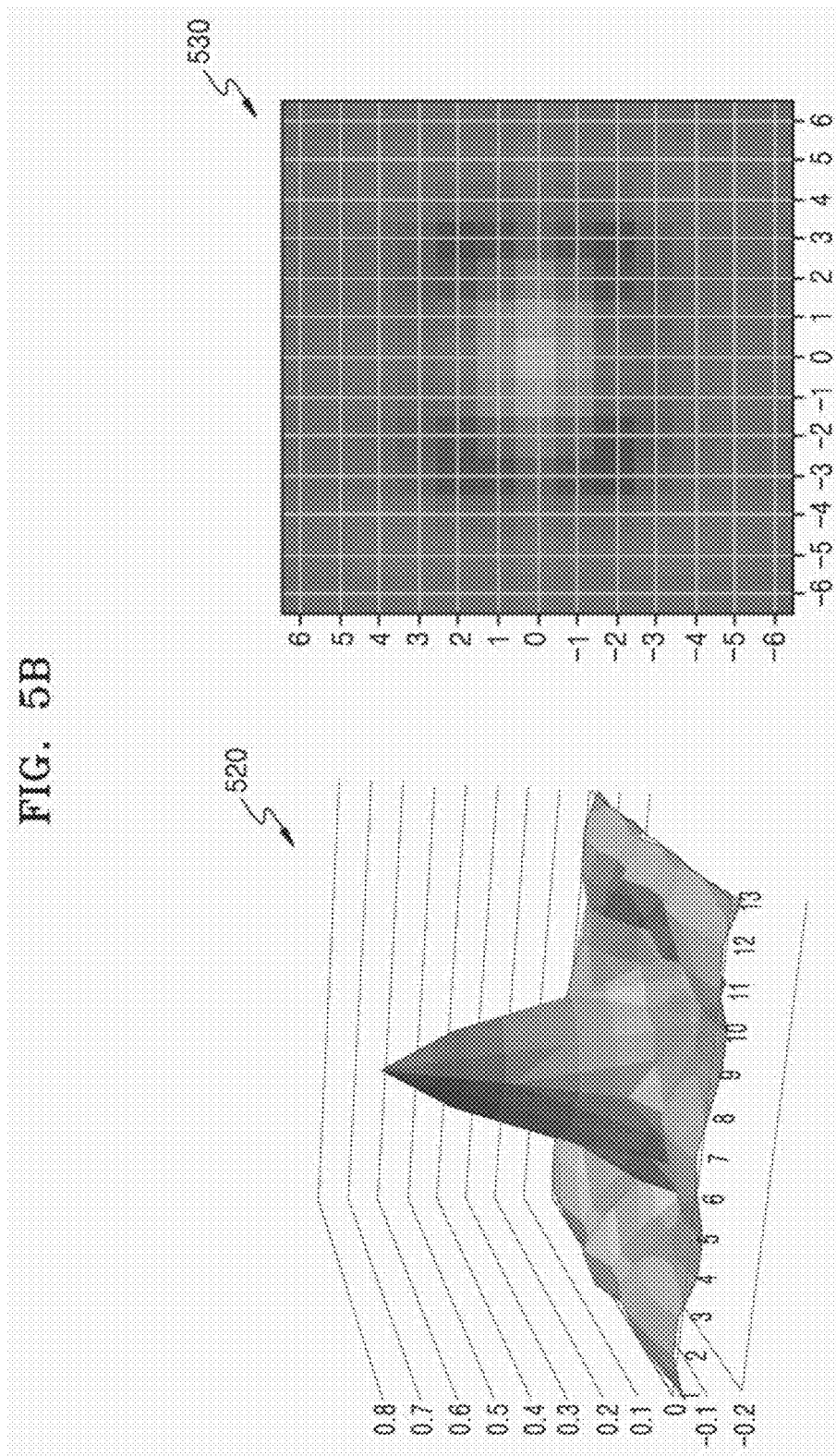
FIG. 5B is a diagram for further describing an example of a first sharpening kernel obtained by an electronic device, according to an embodiment of the disclosure.

FIG. 5B is a diagram for further describing the example of the first sharpening kernel obtained by an electronic device, according to an embodiment of the disclosure.

Reference number 520 represents a result of visualizing a shape of the first sharpening kernel 510 of FIG. 5A. In the result 520, values of the plurality of weights in the first sharpening kernel 510 may be indicated as consecutive values. In order for the electronic device to perform a convolution operation between the first sharpening kernel 510 and a blurry image, the first sharpening kernel 510 of FIG. 5A is obtained by discretizing the values of the plurality of weights in the first sharpening kernel 510 so that the values correspond to a pixel grid. Thus, the electronic device may generate an augmented first sharpening kernel including new weights as indicated by reference number 520 by performing interpolation between adjacent weights from among the plurality of weights of the first sharpening kernel 510.

Reference number 530 represents a result of visualizing values of the plurality of weights in the first sharpening kernel 510 of FIG. 5A. In the result 530, each weight is colored to correspond to one color, and the greater the value of a weight in the positive direction, the brighter the color.

Figure 6:
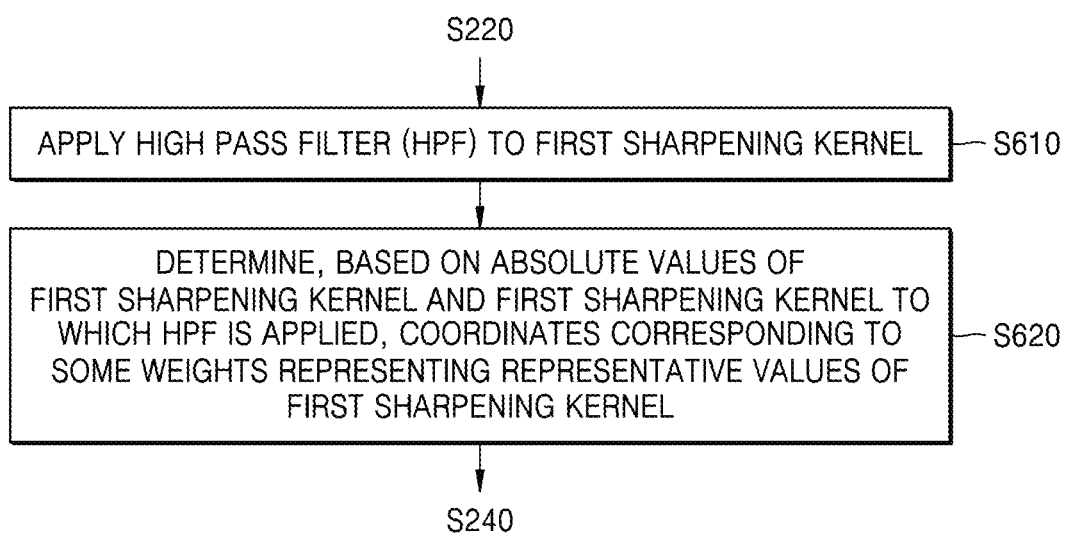
FIG. 6 is a diagram for describing a method, performed by an electronic device, of determining representative values of a first sharpening kernel and coordinates corresponding to the representative values, according to an embodiment of the disclosure.

FIG. 6 is a diagram for describing a method, performed by an electronic device, of determining representative values of a first sharpening kernel and coordinates corresponding to the representative values, according to an embodiment of the disclosure.

According to an embodiment of the disclosure, in operation S610, the electronic device may apply a high pass filter (HPF) to the first sharpening kernel.

In an embodiment of the disclosure, the electronic device may obtain the first sharpening kernel. In this case, a sum of positive weights among a plurality of weights in the first sharpening kernel may be greater than a sum of negative weights by one. The electronic device may obtain the first sharpening kernel with edges enhanced by applying the HPF to the first sharpening kernel. An example of the HPF may be a Laplacian filter or the like, but embodiments of the disclosure are not limited thereto.

According to an embodiment of the disclosure, in operation S620, the electronic device may determine, based on the first sharpening kernel to which the HPF is applied and absolute values of the first sharpening kernel, some weights indicating representative values of the first sharpening kernel and then coordinates corresponding to the determined weights. The electronic device may determine, based on preset conditions, some weights indicating representative values of the first sharpening kernel and then coordinates corresponding to the determined weights.

A first condition is to take absolute values of the first sharpening kernel and determine representative values of the first sharpening kernel from among N weights having absolute values in a descending order. The first condition is for maximizing the effect of the representative values on a result of a convolution operation on an image using a second sharpening kernel composed of the representative values.

A second condition is to take absolute values of the first sharpening kernel to which the HPF is applied and determine representative values of the first sharpening kernel from among M weights having absolute values in a descending order. The second condition is for determining as coordinates positions specified by a rapid change in gradient vectors of the first sharpening kernel and determining as representative values weights at positions that reflect characteristics of a shape of the first sharpening kernel.

A third condition is that a maximum value among some weights indicating representative values of the first sharpening kernel should be located at a center point of the first sharpening kernel, and coordinates of the center point should be determined as (0,0).

A fourth condition is that positions given by coordinates corresponding to some weights indicating representative values of the first sharpening kernel should be symmetrical to one another. In addition, an equal number of weights should be determined as representative values in each quadrant relative to coordinates (0,0) of the center point.

According to an embodiment of the disclosure, by selecting some weights corresponding to the determined coordinates, the electronic device may sample only some weights in the first sharpening kernel to generate a lightweight second sharpening kernel.

FIG. 7A is a diagram for further describing FIG. 6, and illustrates an example of taking absolute values of a first sharpening kernel.

The example of FIG. 7A is described using the first sharpening kernel 510 of FIG. 5A having a size of 13×13 as an example. Referring to FIG. 7A, according to an embodiment of the disclosure, the electronic device may obtain absolute values 710 of the first sharpening kernel. The electronic device may identify first candidate weights for representative values of the first sharpening kernel from the absolute values 710 of the first sharpening kernel (first condition). For example, the electronic device may identify N first candidate weights for N representative values in a descending order of absolute values, and determine representative values of the first sharpening kernel from among the N first candidate weights. In FIG. 7A, colored weights represent first candidate weights for representative values of the first sharpening kernel, and the darker the colored weight, the larger an absolute value of the weight. A weight having a larger absolute value may be a candidate weight having a higher priority when determining representative values of the first sharpening kernel.

The electronic device may determine, based on the absolute values 710 of the first sharpening kernel and absolute values of a first sharpening kernel to which a HPF is applied, some weights indicating representative values of the first sharpening kernel and coordinates corresponding to the determined weights. Absolute values 720 of a first sharpening kernel to which a HPF is applied is described with reference to FIG. 7B.

FIG. 7B is a diagram for further describing FIG. 6, and illustrates an example of taking the absolute values of the first sharpening kernel to which the HPF is applied.

The example of FIG. 7B is described using the first sharpening kernel 510 of FIG. 5A having a size of 13×13 as an example. Referring to FIG. 7B, according to an embodiment of the disclosure, the electronic device may apply the HPF to the first sharpening kernel 510. The HPF may be, for example, a Laplacian filter 715. The electronic device may obtain the first sharpening kernel to which the HPF is applied by performing a convolution operation on the first sharpening kernel 510 using the Laplacian filter 715. According to an embodiment of the disclosure, the electronic device may obtain the absolute values 720 of the first sharpening kernel to which the HPF is applied.

The electronic device may identify second candidate weights for representative values of the first sharpening kernel from the absolute values 720 of the first sharpening kernel to which the HPF is applied (second condition). For example, the electronic device may identify M second candidate weights for M representative values in a descending order of absolute values, and determine representative values of the first sharpening kernel from among the M second candidate weights. In FIG. 7B, colored weights represent second candidate weights for representative values of the first sharpening kernel, and the darker the colored weight, the larger an absolute value of the weight. A weight having a larger absolute value may be a candidate weight having a higher priority when determining representative values of the first sharpening kernel.

The electronic device may determine, based on the absolute values 710 of the first sharpening kernel and the absolute values 720 of the first sharpening kernel to which the HPF is applied, some weights indicating representative values of the first sharpening kernel and coordinates corresponding to the determined weights. The electronic device may determine, based on the remaining preset conditions, some weights indicating representative values of the first sharpening kernel from among the first and second candidate weights, and then determine coordinates corresponding to the determined weights. For example, the electronic device may determine as (0,0) coordinates of a central point where a maximum value of the first sharpening kernel is located (third condition), and also determine as representative values an equal number of weights at positions in each quadrant, which are symmetric with respect to the coordinates (0,0) of the center point (fourth condition).

FIG. 8A is a diagram for describing a method, performed by an electronic device, of generating a second sharpening kernel that is lightweight by determining coordinates corresponding to some weights indicating representative values of a first sharpening kernel, according to an embodiment of the disclosure.

The method of FIG. 8A is described using, as an example, the first sharpening kernel having a size of 13×13 described above with reference to FIGS. 7A and 7B.

According to an embodiment of the disclosure, the electronic device may determine some weights indicating representative values of the first sharpening kernel based on the above-described preset conditions, and determine coordinates corresponding to the determined weights.

In an embodiment of the disclosure, the electronic device may identify, based on the first condition, first candidate weights for representative values of the first sharpening kernel from absolute values of the first sharpening kernel. Furthermore, the electronic device may identify, based on the second condition, second candidate weights for representative values of the first sharpening kernel from absolute values of the first sharpening kernel to which the HPF is applied.

The electronic device may determine, based on the remaining preset conditions, some weights indicating representative values of the first sharpening kernel from among the first candidate weights identified based on the first condition and the second candidate weights identified based on the second condition, and then determine coordinates corresponding to the determined weights. For example, the electronic device may determine as (0,0) coordinates of a central point where a maximum value of the first sharpening kernel is located (third condition), and also determine as representative values an equal number of weights at positions in each quadrant, which are symmetric with respect to the coordinates (0,0) of the center point (fourth condition).

In an embodiment of the disclosure, the electronic device may obtain a sampling number that is the number of weights to be sampled as representative values in the first sharpening kernel. The electronic device may determine, based on the sampling number, representative values in the first sharpening kernel, wherein the number of representative values corresponds to the sampling number.

For example, when the sampling number is five (5), the electronic device may determine 5 representative values in the first sharpening kernel. In this case, the 5 representative values may be determined from among the first and second candidate weights. In detail, the electronic device may determine as representative values of the first sharpening kernel a total of 5 weights, i.e., weight 0.7423 located at coordinates (0,0) of the central point and having a maximum value, weight −0.186 located at coordinates (−3.0, −2.0), weight −0.192 located at coordinates (3.0, −2.0), weight −0.181 located at coordinates (−3.0, 2.0), and weight −0.186 located at coordinates (3.0, 2.0).

Moreover, the above-described example shows representative values and coordinates determined when the first sharpening kernel has a size of 13×13. The size of the first sharpening kernel is not limited thereto, and may be, for example, a 7×7 size. This will be described with reference to FIG. 8B.

Figure 8B:
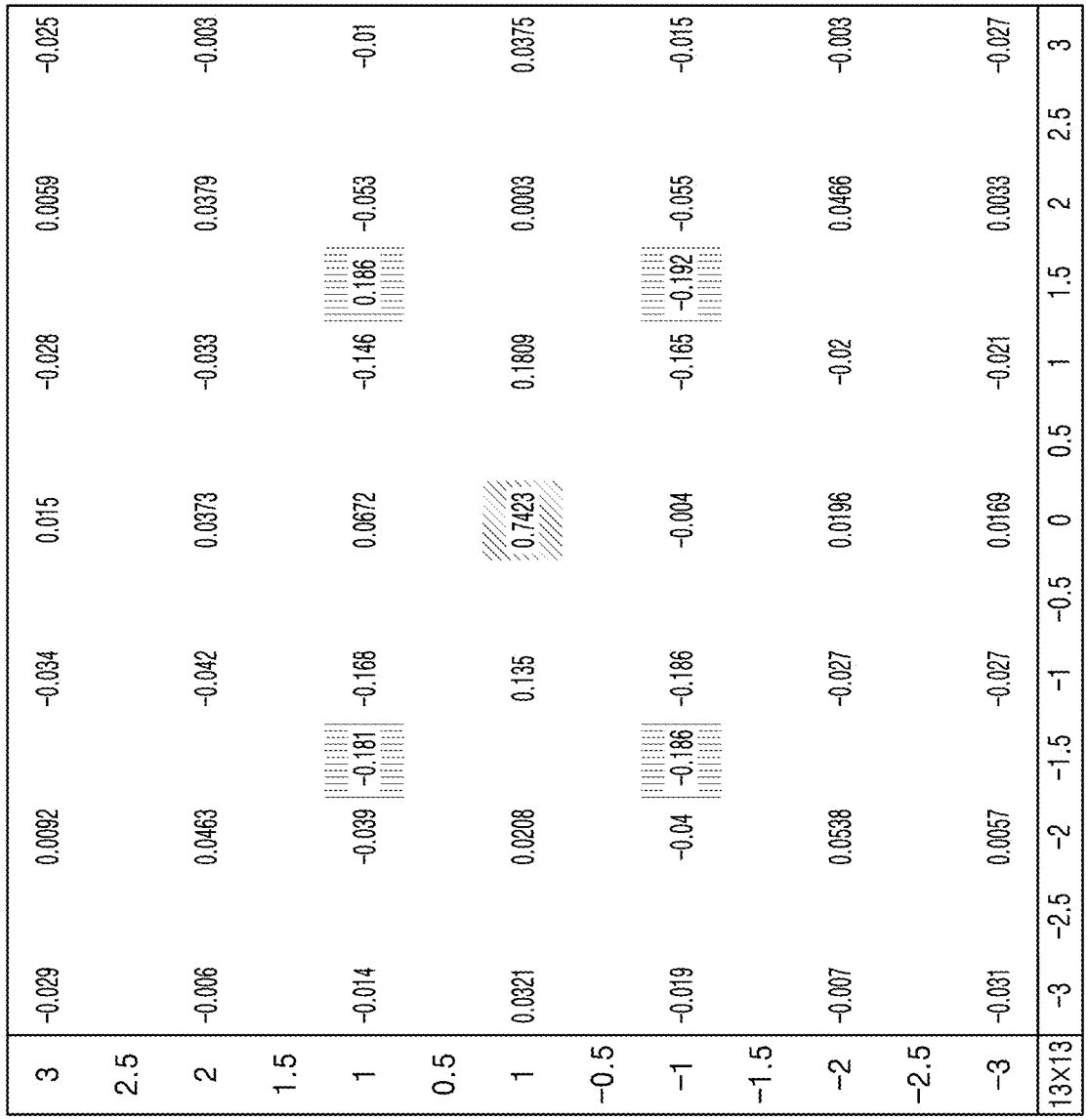
FIG. 8B is a diagram for further describing a method, performed by an electronic device, of generating a second sharpening kernel that is lightweight by determining coordinates corresponding to some weights indicating representative values of a first sharpening kernel, according to an embodiment of the disclosure.

FIG. 8B is a diagram for further describing a method, performed by an electronic device, of generating a second sharpening kernel that is lightweight by determining coordinates corresponding to some weights indicating representative values of a first sharpening kernel, according to an embodiment of the disclosure.

In an embodiment of the disclosure, the electronic device may interpolate adjacent weights from among a plurality of weights in a first sharpening kernel having a size of 7×7 while maintaining the size of the first sharpening kernel, thereby generating an augmented first sharpening kernel including new weights. In this case, the augmented first sharpening kernel may have the same size as the first sharpening kernel of a 7×7 size, but include new weights (e.g., a weight located at coordinates (−1.5, 1)). The electronic device may determine representative values of the augmented first sharpening kernel and coordinates of the representative values according to the embodiment of the disclosure described above with respect to the augmented first sharpening kernel. In detail, the electronic device may determine as representative values of the first sharpening kernel of 7×7 size a total of 5 weights, i.e., weight 0.7423 located at coordinates (0,0) of a central point of the first sharpening kernel and having a maximum value, weight −0.186 located at coordinates (−1.5, −1.0), weight −0.192 located at coordinates (1.5, −1.0), weight −0.181 located at coordinates (−1.5, 1.0), and weight −0.186 located at coordinates (1.5, 1.0).

In an embodiment of the disclosure, when at least some of the determined weights indicating the representative values of the first sharpening kernel include new weights generated using interpolation, a convolution operation may be impossible to perform between the first sharpening kernel and the image because each of the new weights do not correspond to a pixel grid. According to an embodiment of the disclosure, the electronic device 200 may generate pixels corresponding to some of the new weights by performing interpolation on pixels in the image, so that the convolution operation is performed. This will be described in more detail below with reference to FIGS. 13 and 14.

Figure 9:
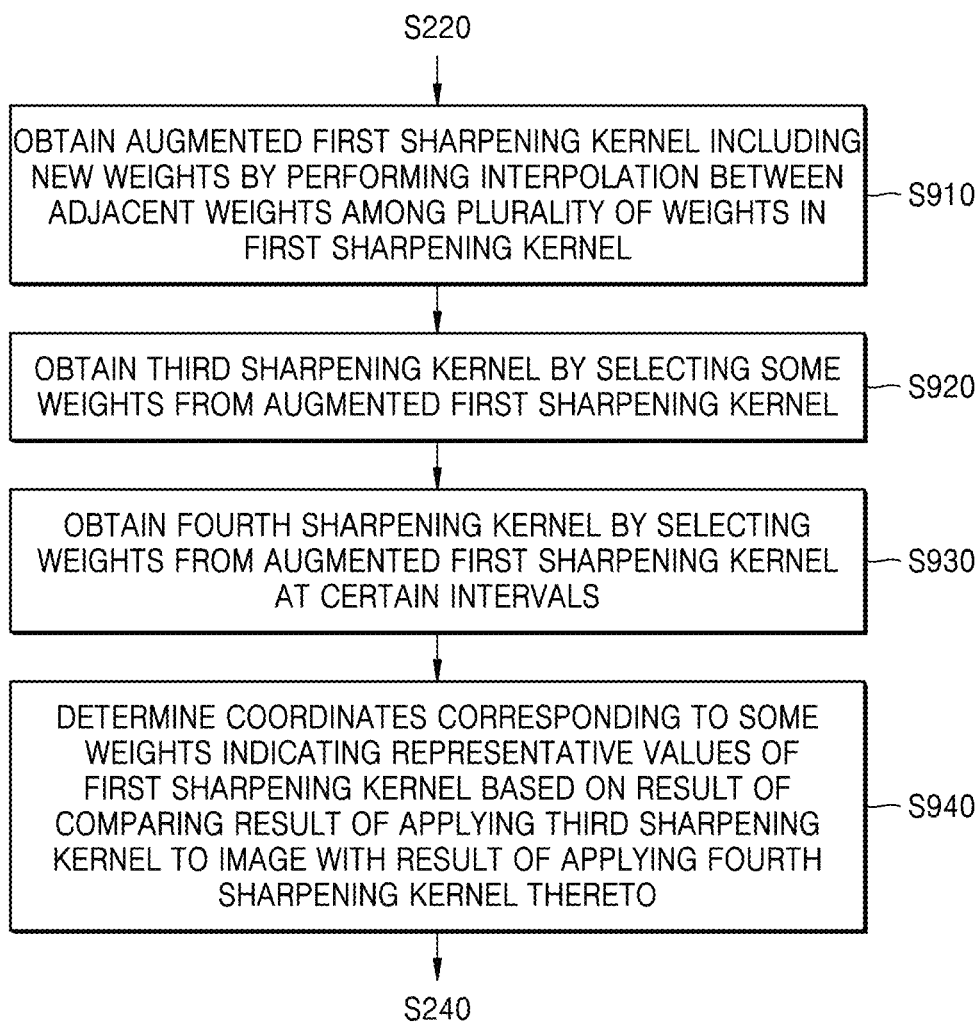
FIG. 9 is a flowchart of another method, performed by an electronic device, of determining representative values of a first sharpening kernel and coordinates corresponding to the representative values, according to an embodiment of the disclosure.

FIG. 9 is a flowchart of another method, performed by an electronic device, of determining representative values of a first sharpening kernel and coordinates corresponding to the representative values, according to an embodiment of the disclosure.

According to an embodiment of the disclosure, in operation S910, the electronic device may obtain an augmented first sharpening kernel including new weights by performing interpolation between adjacent weights among a plurality of weights in the first sharpening kernel.

In an embodiment of the disclosure, the electronic device may generate new weights by performing interpolation between adjacent weights in the first sharpening kernel. The electronic device may generate new weights by predicting possible values between the adjacent weights by using, for example, linear interpolation, bilinear interpolation, or the like.

A kernel in which new weights are interpolated with respect to the first sharpening kernel will hereinafter be referred to as an enhanced first sharpening kernel.

In an embodiment of the disclosure, the electronic device may generate an augmented first sharpening kernel by using an interpolation module. The interpolation module may be a hardware module (e.g., an interpolation circuit) for estimating an intermediate value between sampled data. The electronic device may generate the augmented first sharpening kernel by using the interpolation module.

In another embodiment of the disclosure, the interpolation module of the electronic device may be implemented in software using an interpolation algorithm or in a combination of hardware and software.

According to an embodiment of the disclosure, in operation S920, the electronic device may obtain a third sharpening kernel by selecting some weights (In other words, second weights) in the augmented first sharpening kernel.

In an embodiment of the disclosure, the electronic device may obtain a sampling number that is the number of weights to be sampled as representative values in the augmented first sharpening kernel. The electronic device may select, based on the sampling number, some weights from the augmented first sharpening kernel, wherein the number of weights corresponds to the sampling number. For example, when the sampling number is 5, the electronic device may select 5 weights from the augmented first sharpening kernel. The electronic device may obtain a third sharpening kernel by removing the remaining weights other than the selected 5 weights (e.g., changing values of the remaining weights to 0). In this case, some weights may be selected from the augmented first sharpening kernel with a non-uniform density.

In an embodiment of the disclosure, a plurality of third sharpening kernels may be obtained. The electronic device may compare each of a plurality of third sharpening kernels with a fourth sharpening kernel according to embodiments of the disclosure to be described later, and select one of the third sharpening kernels based on a result of the comparison. Weights in the selected third sharpening kernel may be weights indicating representative values of the augmented first sharpening kernel. In other words, by finally selecting one of the third sharpening kernels, a second sharpening kernel that is a result of reducing the number of weights in the augmented first sharpening kernel may be determined.

According to an embodiment of the disclosure, in operation S930, the electronic device may obtain a fourth sharpening kernel by selecting weights (In other words, third weights) from the augmented first sharpening kernel at certain intervals. According to an embodiment of the disclosure, the fourth sharpening kernel may be obtained by selecting weights from the augmented first sharpening kernel at certain intervals, i.e., by selecting weights therefrom with a uniform density. In this case, the number of weights in the fourth sharpening kernel may be greater than the number of weights in the third sharpening kernel.

According to an embodiment of the disclosure, in operation S940, the electronic device may determine coordinates corresponding to some weights indicating representative values of the first sharpening kernel, based on a result of comparing a result of applying the third sharpening kernel to the image with a result of applying the fourth sharpening kernel thereto.

The electronic device may determine coordinates corresponding to some weights indicating representative values of the first sharpening kernel so that the result of applying the third sharpening kernel to the image and the result of applying the fourth sharpening kernel thereto have a degree of similarity greater than or equal to a preset value. For example, the electronic device may compare a result of sharpening the image using each of a plurality of third sharpening kernels with a result of sharpening the image using the fourth sharpening kernel. The electronic device may determine as representative values of the first sharpening kernel values of weights in one of the plurality of third sharpening kernels that is applied to the image to sharpen the image with a smallest difference from a sharpened image obtained when the fourth sharpening kernel is applied to the image. This will be described in more detail below with reference to FIG. 11.

Figure 10:
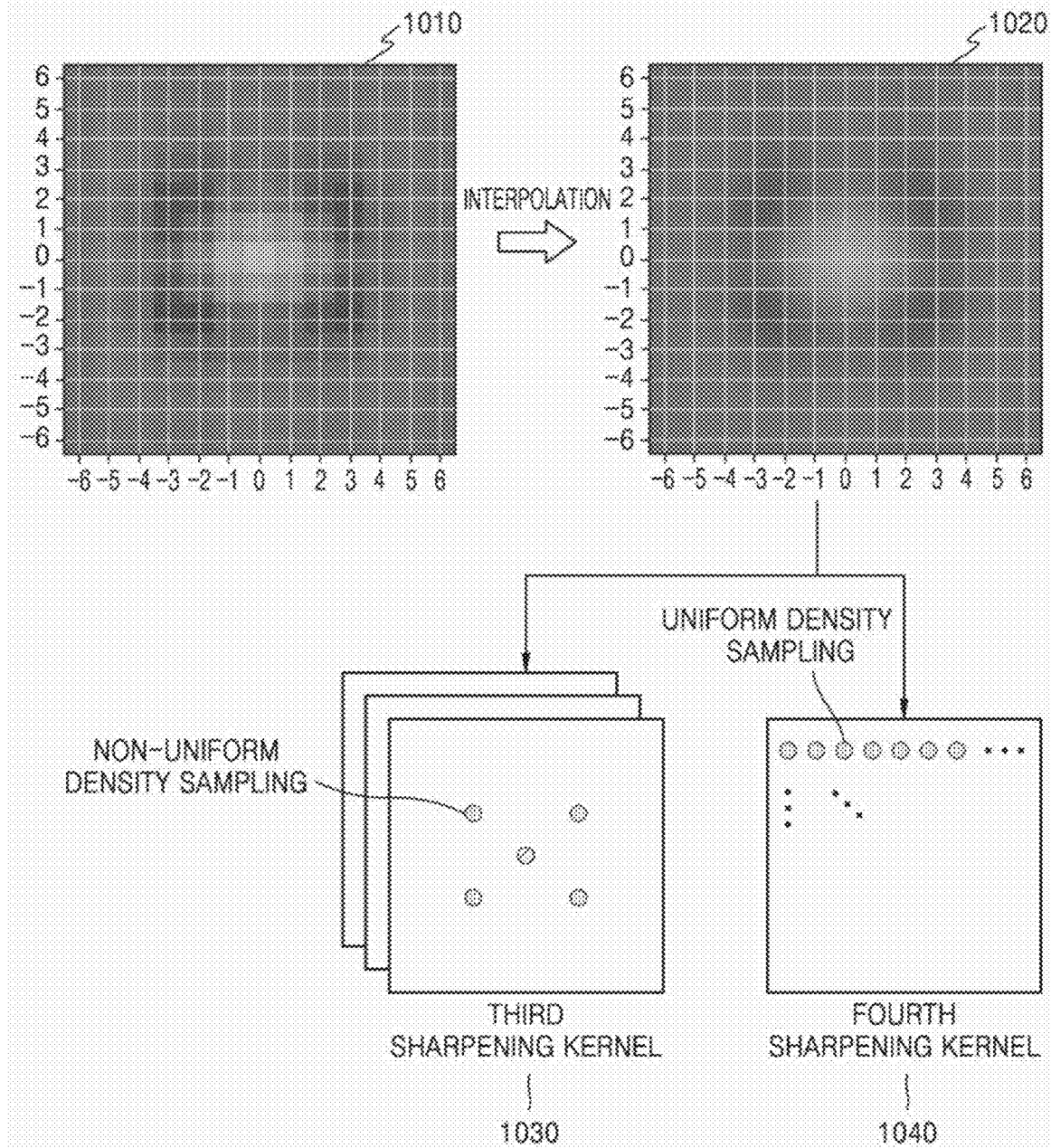
FIG. 10 is a diagram for describing an operation of an electronic device generating an augmented first sharpening kernel by performing interpolation on a first sharpening kernel and then generating third and fourth sharpening kernels, according to an embodiment of the disclosure.

FIG. 10 is a diagram for describing an operation of an electronic device generating an augmented first sharpening kernel by performing interpolation on a first sharpening kernel and generating third and fourth sharpening kernels, according to an embodiment of the disclosure.

The operation illustrated in FIG. 10 is described using, as an example, interpolation performed on the first sharpening kernel having a size of 13×13 described above with reference to FIGS. 7A and 7B.

In an embodiment of the disclosure, the electronic device may generate new weights by performing interpolation between adjacent weights in a first sharpening kernel 1010. The electronic device may generate new weights that are obtained by predicting possible values between the adjacent weights by using, for example, linear interpolation, bilinear interpolation, or the like, and thereby generate an augmented first sharpening kernel 1020.

In an embodiment of the disclosure, the electronic device may generate the augmented first sharpening kernel 1020 by using an interpolation module. The interpolation module may be implemented in software using an interpolation algorithm.

In an embodiment of the disclosure, the electronic device may generate the augmented first sharpening kernel 1020 by using a hardware interpolation module. Alternatively, the electronic device may generate the augmented first sharpening kernel 1020 by using an interpolation module implemented in a combination of hardware and software.

When the electronic device generates the augmented first sharpening kernel 1020 by using an interpolation module implemented in a combination of hardware and software, the augmented first sharpening kernel 1020 may be an augmented kernel having a high resolution and including more weights than that generated via interpolation using an interpolation module implemented in software.

According to an embodiment of the disclosure, the electronic device may obtain a third sharpening kernel 1030 by selecting some weights (In other words, second weights) from the augmented first sharpening kernel 1020. The electronic device may obtain a sampling number that is the number of weights to be sampled as representative values in the augmented first sharpening kernel 1020. The electronic device may select, based on the sampling number, some weights from the augmented first sharpening kernel 1020, wherein the number of weights corresponds to the sampling number. For example, when the sampling number is 5, the electronic device may select 5 weights from the augmented first sharpening kernel 1020. The electronic device may obtain the third sharpening kernel 1030 by removing the remaining weights other than the selected 5 weights (e.g., changing values of the remaining weights to 0). In this case, some weights may be selected from the augmented first sharpening kernel 1020 with a non-uniform density.

According to an embodiment of the disclosure, the electronic device may obtain a fourth sharpening kernel 1040 by selecting weights (In other words, third weights) from the augmented first sharpening kernel 1020 at certain intervals. According to an embodiment of the disclosure, the fourth sharpening kernel 1040 may be obtained by selecting weights from the augmented first sharpening kernel 1020 at certain intervals, i.e., by selecting weights therefrom with a uniform density. In this case, the number of weights in the fourth sharpening kernel 1040 may be greater than the number of weights in the third sharpening kernel 1030.

According to an embodiment of the disclosure, the electronic device may compare a result of applying the third sharpening kernel 1030 to an image with a result of applying the fourth sharpening kernel 1040 thereto. This is now described in more detail with reference to FIG. 11.

Figure 11:
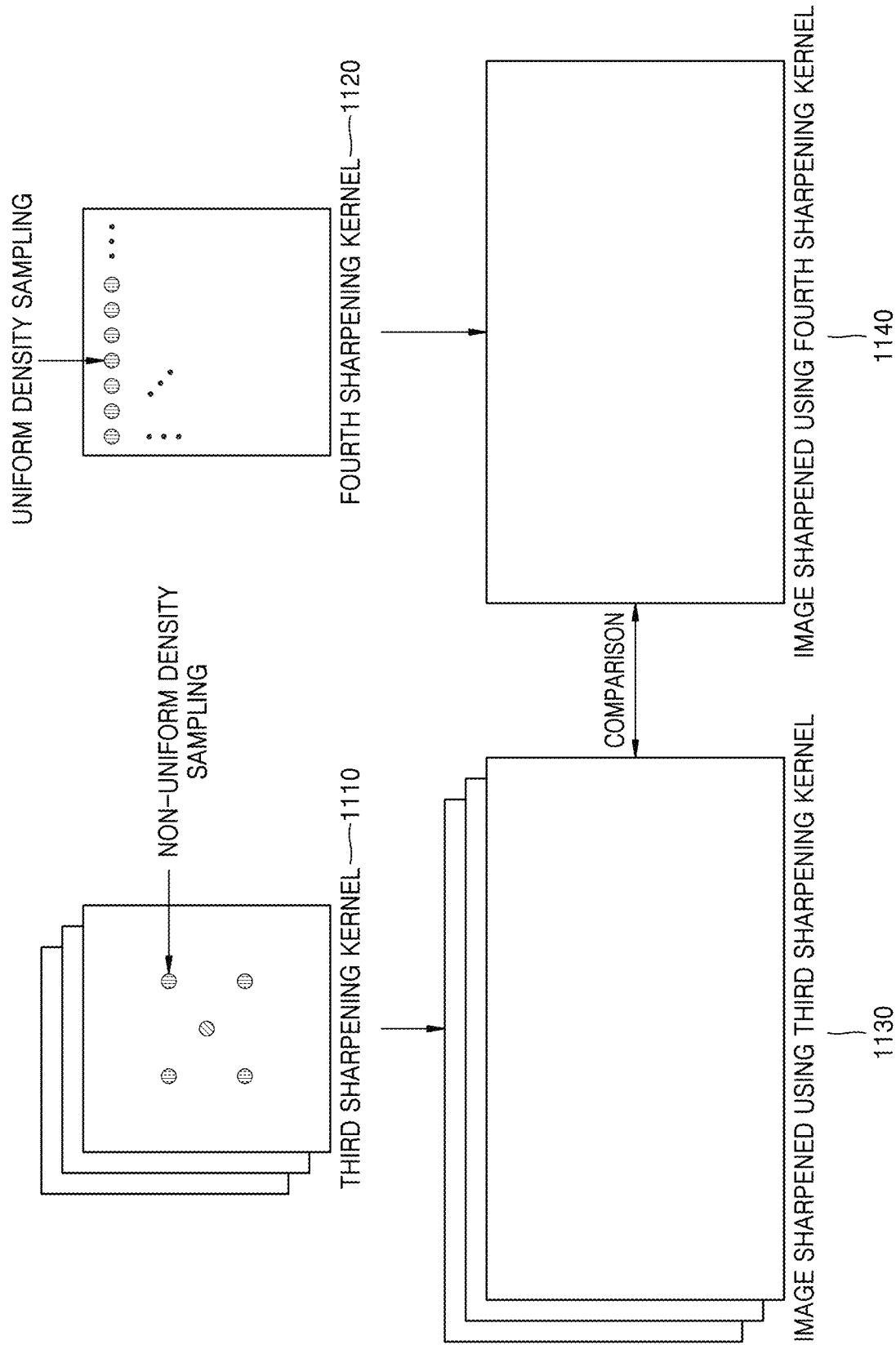
FIG. 11 is a diagram for describing a method, performed by an electronic device, of comparing a third sharpening kernel with a fourth sharpening kernel, according to an embodiment of the disclosure.

FIG. 11 is a diagram for describing a method, performed by an electronic device, of comparing a third sharpening kernel with a fourth sharpening kernel, according to an embodiment of the disclosure.

According to an embodiment of the disclosure, the electronic device may compare a result of applying a third sharpening kernel 1110 to an image with a result of applying a fourth sharpening kernel 1120 thereto.

In an embodiment of the disclosure, the electronic device may apply, to the image, the third sharpening kernel 1110 obtained by selecting some weights from an augmented first sharpening kernel. The electronic device may obtain an image 1130 sharpened using the third sharpening kernel 1110. As the electronic device selects some weights at different positions in the augmented first sharpening kernel, a plurality of third sharpening kernels 1110 may be generated. Thus, there may also be a plurality of images 1130 sharpened using the third sharpening kernel 1110

In an embodiment of the disclosure, the electronic device may apply, to the image, the fourth sharpening kernel 1120 including weights selected from the augmented first sharpening kernel at certain intervals. The electronic device may obtain an image 1140 sharpened using the fourth sharpening kernel 1120.

In an embodiment of the disclosure, the electronic device may compare the image 1130 sharpened using the third sharpening kernel 1110 with the image 1140 sharpened using the fourth sharpening kernel 1120. The electronic device may determine, based on a result of the comparison, coordinates corresponding to some weights indicating representative values of the first sharpening kernel. In this case, the following Equation 1 may be used.

$$S_K^* = \operatorname*{argmin}_{S_K} d(\mathrm{conv}(\mathrm{Image}, \mathrm{Ker}, S_K), \mathrm{conv}(\mathrm{Image}, \mathrm{Ker}, US_{M,N})) \quad \text{[Equation 1]}$$

K denotes a sampling number that is the number of weights to be sampled as representative values in the first sharpening kernel (or the augmented first sharpening kernel). For example, when K=5, 5 representative values may be sampled from among weights in the first sharpening kernel, and the 5 sampled weights become elements of a convolution operation.

$S^*_K$ denotes coordinates corresponding to some weights indicating representative values of the first sharpening kernel (or the augmented first sharpening kernel). Because the electronic device generates a second sharpening kernel by selecting representative values of the first sharpening kernel, $S^*_K$ may be coordinates of weights in the second sharpening kernel. For example, $S^*_K = \{(X_1, Y_1), \ldots, (X_K, Y_K)\}$.

$S_K$ denotes coordinates corresponding to some weights selected from the augmented first sharpening kernel. Because the electronic device generates the third sharpening kernel 1110 by selecting some weights from the augmented first sharpening kernel, $S_K$ may be coordinates of weights in the third sharpening kernel 1110. For example, $S_K = \{(x_1, y_1), \ldots, (x_K, y_K)\}$.

$US_{M,N}$ denotes coordinates corresponding to weights selected from the augmented first sharpening kernel at certain intervals. In other words, because the electronic device generates the fourth sharpening kernel 1120 by selecting weights from the augmented first sharpening kernel at certain intervals, $US_{M,N}$ may be coordinates of weights in the fourth sharpening kernel 1120. For example, $US_{M,N} = \{((\frac{1}{2}+m)^*\Delta x, (\frac{1}{2}+n)^*\Delta y) | m=1, \ldots, M \text{ and } n=1, \ldots, N\}$. In this case, the weights in the fourth sharpening kernel 1120 may be organized in an M×N grid format.

conv(Im,Ker,S) denotes a convolution operation. Here, Im is an image, Ker is a sharpening kernel, and S is coordinates of weights in the sharpening kernel. For example, conv(Image,Ker,$S_K$) may be the image 1130 sharpened using the third sharpening kernel 1110. Furthermore, conv(Image, Ker, $US_{M,N}$) may be the image 1140 sharpened using the third sharpening kernel 1110.

$d(Im_1, Im_2)$ denotes a function for calculating a difference between images $Im_1$ and $Im_2$.

In other words, the electronic device may calculate a difference between the image 1130 sharpened using the third sharpening kernel 1110 and the image 1140 sharpened using the fourth sharpening kernel 1120 by using Equation 1, and obtain coordinates of weights that make the difference between the images 1130 and 1140 the smallest. The electronic device may determine the obtained coordinates as coordinates corresponding to weights indicating representative values of the first sharpening kernel.

According to an embodiment of the disclosure, the electronic device may generate the second sharpening kernel by selecting some weights corresponding to the determined coordinates of weights. The second sharpening kernel may have the same resolution as the first sharpening kernel, and values other than the selected some weights are zero. In other words, the second sharpening kernel may be a lightweight sharpening kernel with fewer effective weights than the first sharpening kernel.

Figure 12:
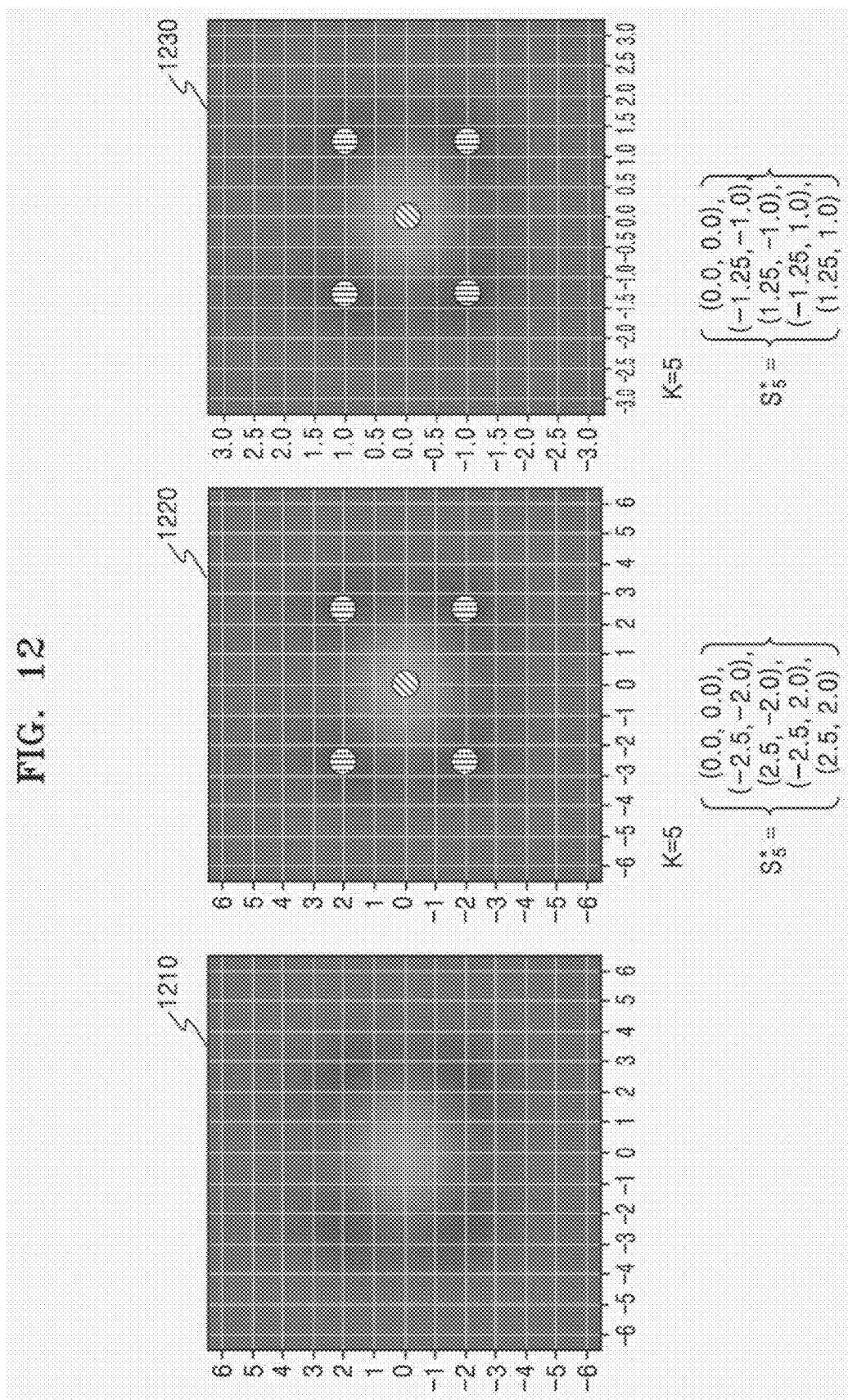
FIG. 12 illustrates a result of an electronic device determining coordinates corresponding to weights indicating representative values of a first sharpening kernel by comparing a third sharpening kernel with a fourth sharpening kernel, according to an embodiment of the disclosure.

FIG. 12 illustrates a result of an electronic device determining coordinates corresponding to weights indicating representative values of a first sharpening kernel by comparing a third sharpening kernel with a fourth sharpening kernel, according to an embodiment of the disclosure.

In an embodiment of the disclosure, the electronic device may generate third and fourth sharpening kernels from an augmented first sharpening kernel 1210, and determine coordinates corresponding to weights indicating representative values of the first sharpening kernel based on a result of comparing an image sharpened using the third sharpening kernel with an image sharpened using the fourth sharpening kernel. Because the method of the comparing has been described in detail with reference to FIG. 11, descriptions already provided above will be omitted.

In an embodiment of the disclosure, when a sampling number is 5 and the first sharpening kernel has a size of 13×13, the electronic device may determine coordinates corresponding to weights indicating representative values of the first sharpening kernel according to the above-described embodiments of the disclosure. The coordinates corresponding to the weights indicating the representative values of the first sharpening kernel may be (0.0, 0.0), (−2.5, −2.0), (2.5, −2.0), (−2.5, 2.0), and (2.5, 2.0). The electronic device may obtain a second sharpening kernel 1220 by selecting the weights corresponding to the coordinates (0.0, 0.0), (−2.5, −2.0), (2.5, −2.0), (−2.5, 2.0), and (2.5, 2.0) and thus reducing the number of weights in the first sharpening kernel having a size of 13×13.

In an embodiment of the disclosure, when a sampling number is 5 and the first sharpening kernel has a size of 7×7, the electronic device may determine coordinates corresponding to weights indicating representative values of the first sharpening kernel according to the above-described embodiments of the disclosure. The coordinates corresponding to the weights indicating the representative values of the first sharpening kernel may be (0.0, 0.0), (−1.25, −1.0), (1.25, −1.0), (−1.25, 1.0), and (1.25, 1.0). The electronic device may obtain a second sharpening kernel 1230 by selecting the weights corresponding to the coordinates (0.0, 0.0), (−1.25, −1.0), (1.25, −1.0), (−1.25, 1.0), and (1.25, 1.0) and thus reducing the number of weights in the first sharpening kernel having a size of 7×7.

Figure 13:
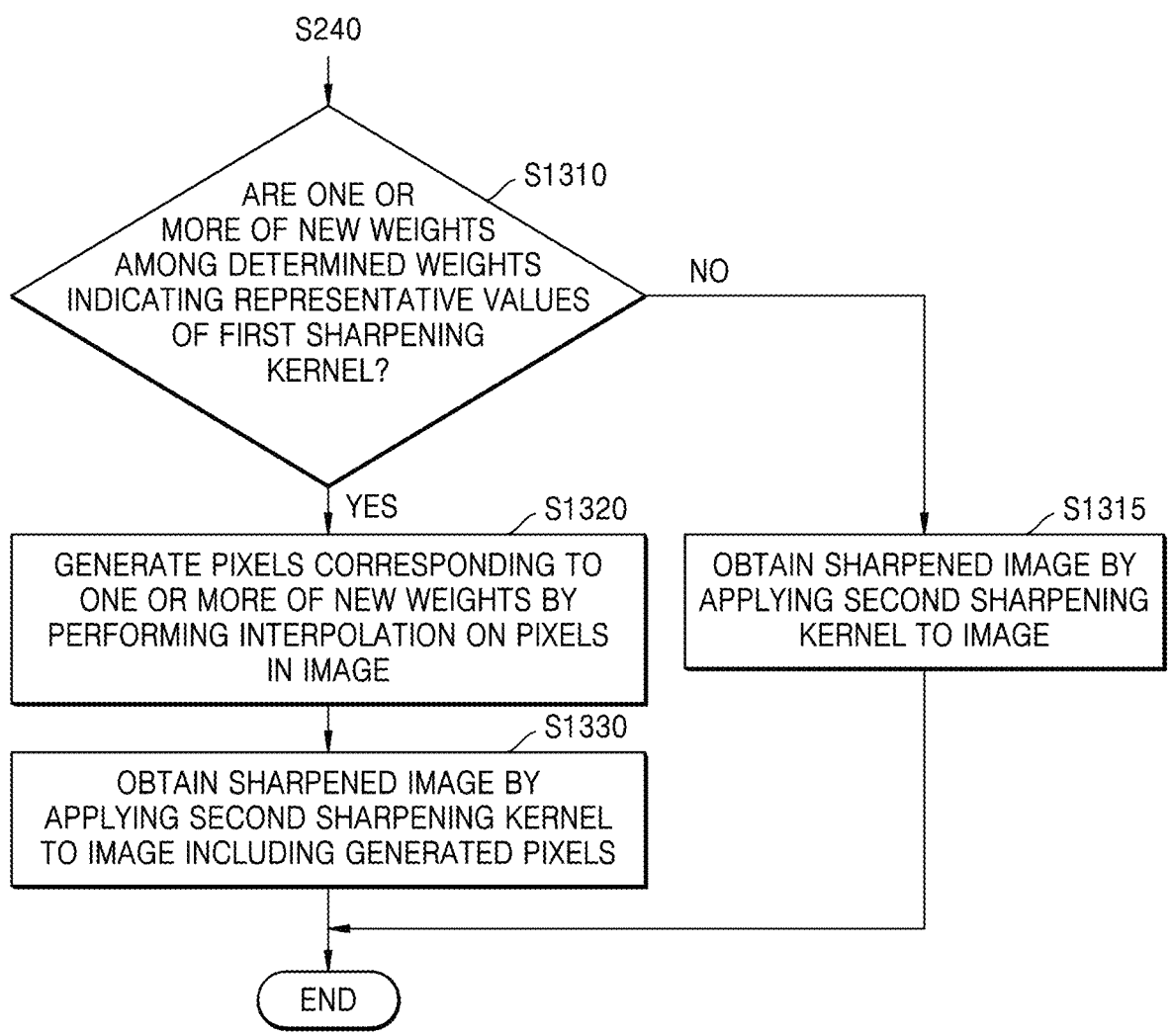
FIG. 13 is a flowchart of a method, performed by an electronic device, of performing interpolation on an image for a convolution operation between a second sharpening kernel and the image, according to an embodiment of the disclosure.

FIG. 13 is a flowchart of a method, performed by an electronic device, of performing interpolation on an image for a convolution operation between a second sharpening kernel and the image, according to an embodiment of the disclosure.

According to an embodiment of the disclosure, in operation S1310, the electronic device may identify whether one or more of the new weights are among the determined weights indicating the representative values of the first sharpening kernel.

When one or more of the new weights are among the determined weights indicating the representative values of the first sharpening kernel, it is understood that the new weights are generated as the electronic device generates an augmented first sharpening kernel by interpolating the first sharpening kernel and some of the representative values of the first sharpening kernel are determined from among the new weights in the augmented first sharpening kernel.

According to an embodiment of the disclosure, when one or more of the new weights are not among the determined weights indicating the representative values of the first sharpening kernel, the electronic device may perform operation S1315. On the other hand, when one or more of the new weights are among the determined weights indicating the representative values of the first sharpening kernel, the electronic device may perform operation S1320.

According to an embodiment of the disclosure, in operation S1315, the electronic device may obtain a sharpened image by applying the second sharpening kernel to the image. Operation S1315 may correspond to operation S250 of FIG. 2.

According to an embodiment of the disclosure, in operation S1320, the electronic device may generate pixels corresponding to some of the new weights by performing interpolation on pixels in the image. In an embodiment of the disclosure, because the new weights in the augmented first sharpening kernel are generated using interpolation, they are weights at positions (coordinates) not corresponding to positions in a pixel grid. When some of the representative values of the first sharpening kernel are determined from among the new weights in the augmented first sharpening kernel, the electronic device may generate new pixels to be used to perform a convolution operation with the new weights by performing interpolation on pixels in the image.

According to an embodiment of the disclosure, in operation S1330, the electronic device may obtain a sharpened image by applying the second sharpening kernel to an image including the pixels generated by performing interpolation on the pixels in the image. In this case, because pixels corresponding to weights of the second sharpening kernel are generated using interpolation, the electronic device is capable of performing a convolution operation between the second sharpening kernel and the image.

FIG. 14 is a diagram for further describing the method of FIG. 13, and is a diagram for describing an example in which one or more of the new weights are included in some weights indicating representative values of a first sharpening kernel.

The example of FIG. 14 is described with respect to a first sharpening kernel 1410 having a size of 7×7.

Referring to FIG. 14, the first sharpening kernel 1410 may have a size of 7×7 and include a total of 49 weights. Each of the 49 weights may correspond to a position on a pixel grid for an image so that a convolution operation may be performed between the 49 weights and pixels in the image.

In an embodiment of the disclosure, the electronic device may determine representative values of the first sharpening kernel 1410 and coordinates corresponding to the representative values according to the above-described embodiments of the disclosure.

For example, as a result of the electronic device determining the coordinates corresponding to the representative values of the first sharpening kernel 1410, the determined coordinates may be (0, 0), (−1.5, 1.0), (1.5, 1.0), (−1.5, −1.0), and (1.5, −1.0). In this case, weights respectively corresponding to the coordinates (0, 0), (−1.5, 1.0), (1.5, 1.0), (−1.5, −1.0), and (1.5, −1.0) may be 0.7423, −0.181, −0.186, −0.186, and −0.192.

According to an embodiment of the disclosure, the electronic device may generate a second sharpening kernel 1420 by selecting the weights corresponding to the determined coordinates.

The second sharpening kernel 1420 may have the same size as the first sharpening kernel 1410, but include fewer weights than the first sharpening kernel 1410. In addition, positions of the weights in the second sharpening kernel 1420 may be determined by the electronic device sampling weights in the first sharpening kernel 1410 with a non-uniform density according to the above-described embodiments of the disclosure, instead of selecting weights from the first sharpening kernel 1410 at certain intervals and sampling them with a uniform density.

In an embodiment of the disclosure, the electronic device may obtain a sharpened image by applying the second sharpening kernel 1420 to the image. The electronic device may sharpen the image by performing a convolution operation on the image with the second sharpening kernel 1420.

When the electronic device performs the convolution operation on the image by using the second sharpening kernel 1420, the electronic device may identify whether one or more of the new weights are among the determined weights indicating the representative values of the first sharpening kernel 410. In other words, the electronic device may identify whether one or more of the new weights are included in some weights in the second sharpening kernel 1420.

In this case, weights 1422, 1424, 1426, and 1428 in the second sharpening kernel 1420 are determined by generating new weights as the electronic device generates an augmented first sharpening kernel by interpolating the first sharpening kernel 1410 and determining some of the representative values of the first sharpening kernel 1410 from among the new weights in the augmented first sharpening kernel. Thus, because the weights 1422, 1424, 1426, and 1428 are generated using interpolation, they are weights at positions (coordinates) that do not correspond to positions in the pixel grid.

According to an embodiment of the disclosure, the electronic device may generate new pixels by interpolating pixels in the image so that a convolution operation may be performed between the weights 1422, 1424, 1426, and 1428 and the image. In this case, because pixels corresponding to the weights 1422, 1424, 1426, and 1428 in the second sharpening kernel 1420 are generated using interpolation, the electronic device may sharpen the image by performing a convolution operation between the second sharpening kernel 1420 and the image.

Figure 15:
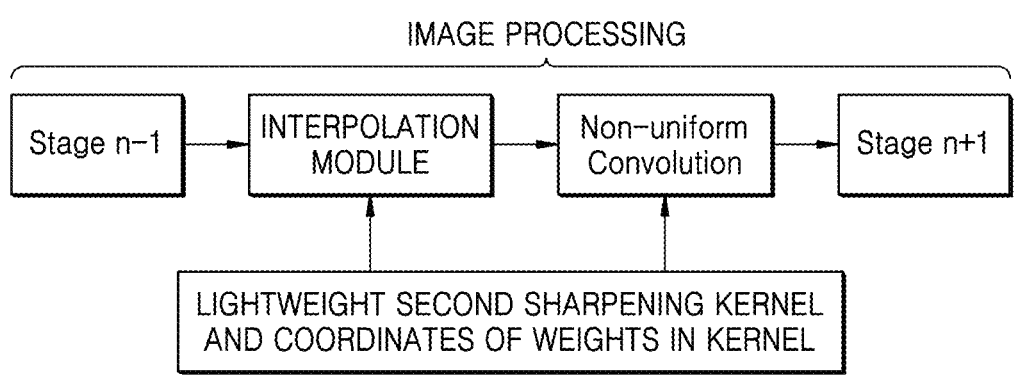
FIG. 15 is a diagram illustrating a part of an image processing operation performed by an electronic device, according to an embodiment of the disclosure.

FIG. 15 is a diagram illustrating a part of an image processing operation performed by an electronic device, according to an embodiment of the disclosure.

According to an embodiment of the disclosure, the electronic device may obtain a lightweight second sharpening kernel by sampling only some weights in a first sharpening kernel with a non-uniform density according to the above-described embodiments of the disclosure, and determine coordinates of weights in the second sharpening kernel.

According to an embodiment of the disclosure, the electronic device may generate new pixels by interpolating an image using an interpolation module. The electronic device may generate, in the image, pixels at positions corresponding to the coordinates of the weights in the second sharpening kernel by using the interpolation module.

The electronic device may perform a convolution operation between the image and the second sharpening kernel. In this case, because the positions of the weights in the second sharpening kernel may be determined by sampling only some weights in the first sharpening kernel with a non-uniform density, the convolution operation performed by the electronic device may be non-uniform convolution.

According to an embodiment of the disclosure, the electronic device may sharpen the image by performing a non-uniform convolution operation on the image with the second sharpening kernel.

Figure 16:
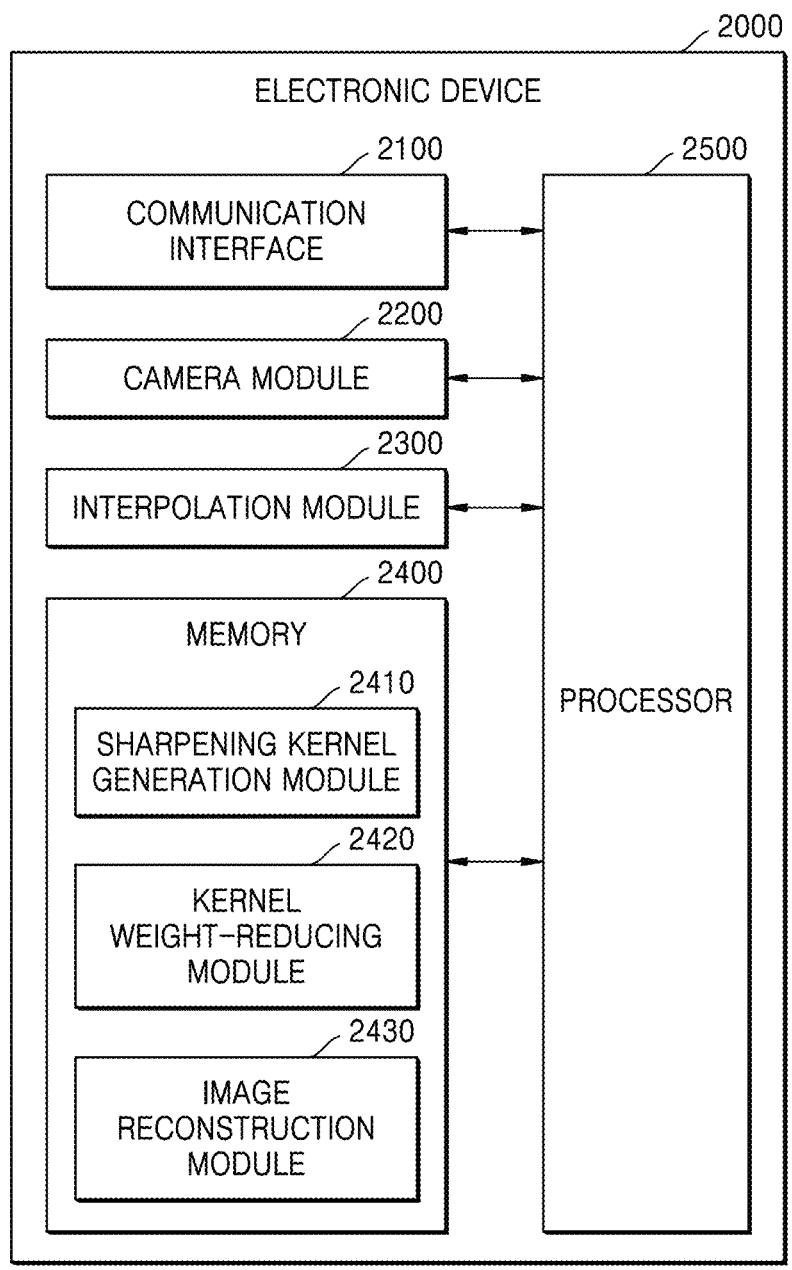

FIG. 16 is a block diagram of a configuration of an electronic device according to an embodiment of the disclosure.

An electronic device 2000 according to an embodiment of the disclosure may include a communication interface 2100, a camera module (camera) 2200, an interpolation module 2300, a memory 2400, and a processor 2500.

The communication interface 2100 may perform data communication with a server or other electronic devices according to control by the processor 2500.

For example, the communication interface 2100 may perform data communication with the server or the other electronic devices by using at least one from among data communication methods including a wired local area network, a wireless LAN, Wi-Fi, Bluetooth, Zigbee, Wi-Fi Direct (WFD), Infrared Data Association (IrDA), Bluetooth Low Energy (BLE), Near Field Communication (NFC), Wireless Broadband Internet (Wibro), World Interoperability for Microwave Access (WiMAX), Shared Wireless Access Protocol (SWAP), Wireless Gigabit Alliance (Wi-Gig), and radio frequency (RF) communication.

According to an embodiment of the disclosure, the communication interface 2100 may transmit or receive to or from an external device data for obtaining a second sharpening kernel by reducing the number of weights of a first sharpening kernel. For example, the communication interface 2100 may transmit the first sharpening kernel to the server and receive the second sharpening kernel from the server.

The camera module 2200 may capture an image of an object according to control by the processor 2400. The camera module 2200 may include, for example, an EDoF camera including a DOE. In this case, the image captured by the camera module 2200 may be a blurry image including blur that occurs due to the camera module 2200.

The interpolation module 2300 may be a hardware module (e.g., an interpolation circuit) for estimating an intermediate value between sampled data. The interpolation module 2300 may generate an augmented first sharpening kernel by generating new weights via interpolation of the first sharpening kernel, or generate pixels corresponding to weights in the second sharpening kernel by interpolating the image.

The memory 2400 may store instructions, data structures, and program code that are readable by the processor 2500. In the embodiments of the disclosure, operations performed by the processor 2500 may be implemented by executing instructions or code of a program stored in the memory 2400.

The memory 2400 may include, for example, a non-volatile memory including at least one of a flash memory-type memory, a hard disk-type memory, a multimedia card micro-type memory, a card-type memory (e.g., an SD card or an XD memory), read-only memory (ROM), electrically erasable programmable ROM (EEPROM), PROM, a magnetic memory, a magnetic disk, or an optical disk, and a volatile memory such as random access memory (RAM) or static RAM (SRAM).

According to an embodiment of the disclosure, the memory 2400 may store various types of data that may be used to sharpen an image. For example, a sharpening kernel generation module 2410, a kernel weight-reducing module 2420, and an image reconstruction module 2430 may be stored in the memory 2400.

The processor 2500 may control all operations of the electronic device 2000. For example, the processor 2500 may control all operations of the electronic device 2000 sharpening an image by executing one or more instructions in a program stored in the memory 2400.

For example, the processor 2500 may include, but is not limited thereto, at least one of a central processing unit (CPU), a microprocessor, a graphics processing unit (GPU), application specific integrated circuits (ASICs), digital signal processors (DSPs), digital signal processing devices (DSPDs), programmable logic devices (PLDs), field programmable gate arrays (FPGAs), an application processor (AP), a neural processing unit (NPU), or a dedicated artificial intelligence (AI) processor designed with a hardware structure specialized for processing an AI model.

In an embodiment of the disclosure, the processor 2500 may generate the first sharpening kernel by executing the sharpening kernel generation module 2410. The processor 2500 may control the camera module 2200 to obtain a reference image, and estimate a PSF based on the reference image. The processor 2500 may generate a first sharpening kernel based on the PSF. Because this has already been described in the above-described embodiments of the disclosure, descriptions already provided will be omitted.

In an embodiment of the disclosure, the processor 2500 may execute the kernel weight-reducing module 2420 to generate a second sharpening kernel by reducing the number of weights in the first sharpening kernel. The processor 2500 may determine some weights representing representative values of the first sharpening kernel, and determine coordinates corresponding to the determined weights. The processor 2500 may generate the second sharpening kernel by selecting some weights corresponding to the determined coordinates. Because this has already been described in the above-described embodiments of the disclosure, descriptions already provided will be omitted.

In an embodiment of the disclosure, the processor 2500 may sharpen the image by executing the image restoration module 2430. The processor 2500 may obtain a sharpened image by performing a convolution operation between the second sharpening kernel and the image. Because this has already been described in the above-described embodiments of the disclosure, descriptions already provided will be omitted.

Figure 17:
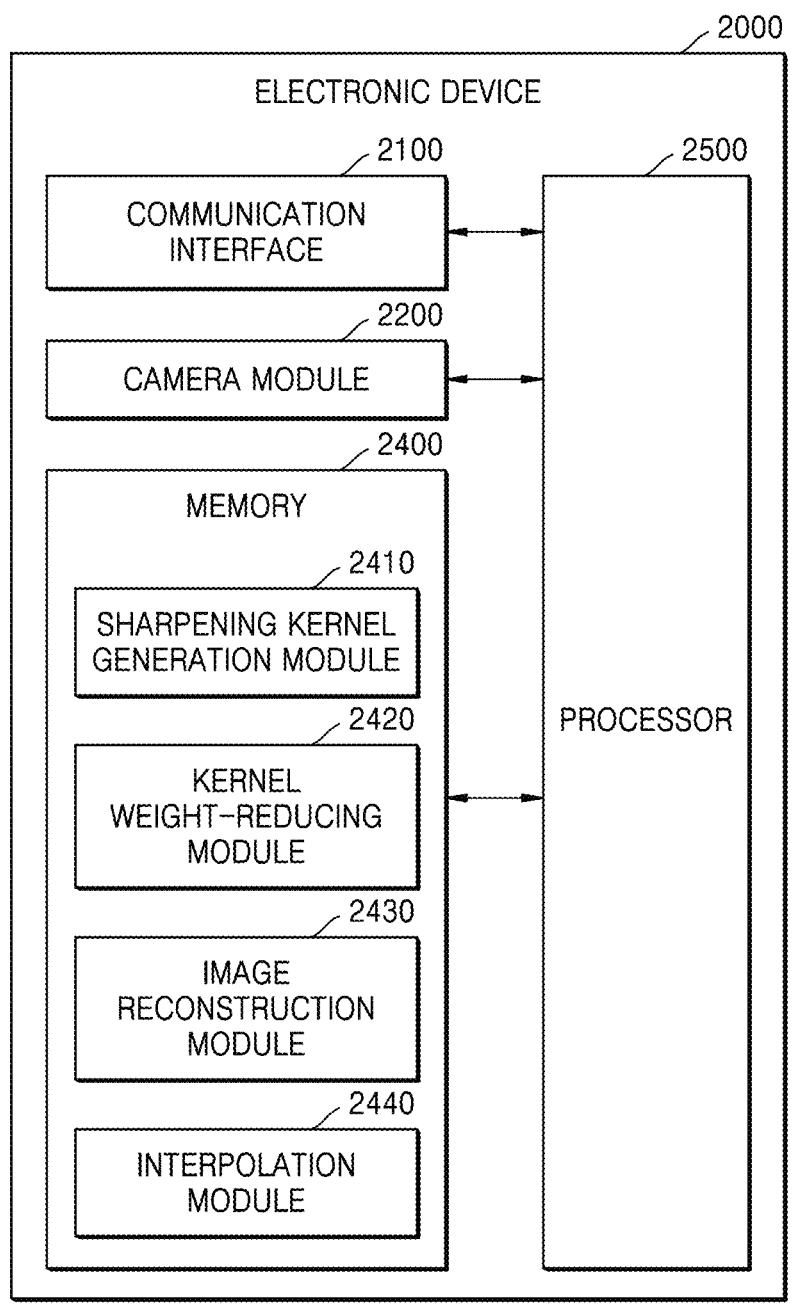
FIG. 17 is a block diagram of another configuration of an electronic device according to an embodiment of the disclosure.

FIG. 17 is a block diagram of another configuration of an electronic device according to an embodiment of the disclosure.

An electronic device 2000 according to an embodiment of the disclosure may include a communication interface 2100, a camera module (camera) 2200, a memory 2400, and a processor 2500. Because the components of the electronic device 2000 may correspond to their counterparts of FIG. 16, descriptions already provided above with respect to FIG. 16 will be omitted.

In an embodiment of the disclosure, an interpolation module 2440 may be implemented in software using an interpolation algorithm. For example, the interpolation module 2440 may be stored in the memory 2400.

The processor 2500 may generate an augmented first sharpening kernel by executing the interpolation module 2440 to interpolate the first sharpening kernel and thereby generate new weights. The processor 2500 may generate pixels corresponding to weights in the second sharpening kernel by interpolating image.

Moreover, the block diagrams of the electronic devices 2000 of FIGS. 16 and 17 may be provided for illustration of embodiments of the disclosure. Each of the components in the block diagram may be integrated, added, or omitted according to the specification of each electronic device 2000 that is actually implemented. In other words, two or more components may be combined into a single component, or a single component may be split into two or more components when necessary. Furthermore, functions performed in each block are intended to describe the embodiments of the disclosure, and a specific operation or apparatus related to the functions does not limit the scope of the disclosure.

An operation method of an electronic device according to an embodiment of the disclosure may be implemented in the form of program instructions executable by various types of computers and may be recorded on non-transitory computer-readable recording media. The computer-readable recording media may include program instructions, data files, data structures, etc. either alone or in combination. The program instructions recorded on the computer-readable recording media may be designed and configured specially for the disclosure or may be known to and be usable by those skilled in the art of computer software. Examples of the computer-readable recording media include magnetic media such as hard disks, floppy disks, and magnetic tape, optical media such as compact disk-ROM (CD-ROM) and digital versatile disks (DVDs), magneto-optical media such as floptical disks, and hardware devices that are specially configured to store and perform program instructions, such as ROM, RAM, flash memory, etc. Examples of program instructions include not only machine code such as that generated by a compiler but also high-level language code executable by a computer using an interpreter or the like. A computer-readable recording medium may be provided in the form of a non-transitory recording medium. In this regard, the term 'non-transitory' only means that the recording medium does not include a signal (e.g., electromagnetic wave) and is a tangible device, and the term does not differentiate between where data is semi-permanently stored in the recording medium and where the data is temporarily stored in the recording medium. For example, a 'non-transitory storage medium' may include a buffer for temporarily storing data.

Furthermore, operation methods of an electronic device according to embodiments of the disclosure may be included in a computer program product when provided. The computer program product may be traded, as a product, between a seller and a buyer.

The computer program product may include a software program and a computer-readable storage medium having stored thereon the software program. For example, the computer program product may include a product (e.g. a downloadable application) in the form of a software program electronically distributed by a manufacturer of an electronic device or through an electronic market. For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system consisting of a server and a client device, the computer program product may include a storage medium of the server or a storage medium of the client device. Alternatively, in a case where a third device (e.g., a smartphone) is communicatively connected to the server or client device, the computer program product may include a storage medium of the third device. Alternatively, the computer program product may include a software program itself that is transmitted from the server to the client device or the third device or that is transmitted from the third device to the client device.

In this case, one of the server, the client device, and the third device may execute the computer program product to perform methods according to embodiments of the disclosure. Alternatively, two or more of the server, the client device, and the third device may execute the computer program product to perform the methods according to the embodiments of the disclosure in a distributed manner.

For example, the server (e.g., a cloud server, an AI server, or the like) may execute the computer program product stored therein to control the client device communicatively connected to the server to perform the methods according to the embodiments of the disclosure.

While embodiments of the disclosure have been particularly described above with reference to the figures, it will be understood that the scope of the disclosure is not limited to the embodiments of the disclosure and various modifications and improvements made by those of ordinary skill in the art based on a basic concept of the disclosure also fall within the scope as defined by the following claims.

What is claimed is:

1. A method, performed by an electronic device, the method comprising:
    obtaining an image by a camera of the electronic device;
    obtaining a first sharpening kernel for enhancing sharpness of the image, wherein the first sharpening kernel is data including a plurality of weights to be applied to pixels in the image, and the data is of a lower resolution than the image;
    determining coordinates corresponding to first weights indicating representative values of the first sharpening kernel from among the plurality of weights in the first sharpening kernel, wherein the representative values are values indicating feature points of a shape of the first sharpening kernel;
    generating a second sharpening kernel by selecting the first weights corresponding to the determined coordinates; and
    obtaining a sharpened image by applying the second sharpening kernel to the image.

2. The method of claim 1, wherein the obtaining the first sharpening kernel comprises:
    obtaining, by using the camera of the electronic device, a reference image;
    calculating a point spread function based on the reference image; and
    obtaining the first sharpening kernel based on the point spread function.

3. The method of claim 1, wherein the determining the coordinates corresponding to the first weights indicating the representative values of the first sharpening kernel comprises determining as zero point coordinates of a weight, from among the plurality of weights, corresponding to a center point of the first sharpening kernel.

4. The method of claim 1, further comprising obtaining an augmented first sharpening kernel including new weights by performing interpolation between adjacent weights among the plurality of weights in the first sharpening kernel.

5. The method of claim 4, wherein the determining the coordinates corresponding to the first weights comprises determining the coordinates corresponding to the first weights from among the new weights in the augmented first sharpening kernel.

6. The method of claim 5, further comprising:
    obtaining a third sharpening kernel by selecting second weights in the augmented first sharpening kernel; and
    obtaining a fourth sharpening kernel by selecting third weights from the augmented first sharpening kernel at certain intervals,
    wherein the determining the coordinates corresponding to the first weights indicating the representative values of the first sharpening kernel comprises determining the coordinates corresponding to the first weights indicating the representative values of the first sharpening kernel, based on a comparison of a result of applying the third sharpening kernel to the image with a result of applying the fourth sharpening kernel to the image.

7. The method of claim 6, wherein a number of weights in the fourth sharpening kernel is greater than a number of weights in the third sharpening kernel.

8. The method of claim 5, further comprising, based on one or more of the new weights being included in the first weights indicating the representative values of the first sharpening kernel, generating pixels corresponding to the one or more of the new weights by performing interpolation on the pixels in the image.

9. The method of claim 1, wherein the determining the coordinates corresponding to the first weights indicating the representative values of the first sharpening kernel comprises:
    applying a high pass filter to the first sharpening kernel; and
    determining, based on absolute values of the first sharpening kernel and absolute values of the first sharpening kernel to which the high pass filter is applied, the coordinates corresponding to the first weights indicating the representative values of the first sharpening kernel.

10. The method of claim 9, wherein the first weights in the second sharpening kernel are weights at positions symmetric with respect to a center point of the second sharpening kernel, and
    a maximum value among the first weights in the second sharpening kernel is located at the center point of the second sharpening kernel.

11. An electronic device comprising:
    a communication interface;
    a camera;
    a memory storing one or more instructions; and
    at least one processor configured to execute the one or more instructions stored in the memory to:
    obtain an image generated by the camera,
    obtain a first sharpening kernel for enhancing sharpness of the image, wherein the first sharpening kernel is data including a plurality of weights to be applied to pixels in the image, and the data is of a lower resolution than the image,
    determine coordinates corresponding to first weights indicating representative values of the first sharpening kernel from among the plurality of weights in the first sharpening kernel, wherein the representative values are values indicating feature points of a shape of the first sharpening kernel,
    generate a second sharpening kernel by selecting the first weights corresponding to the determined coordinates, and
    obtain a sharpened image by applying the second sharpening kernel to the image.

12. The electronic device of claim 11, wherein the at least one processor is further configured to execute the one or more instructions to:
  obtain a reference image by using the camera;
  calculate a point spread function based on the reference image; and
  obtain the first sharpening kernel based on the point spread function.

13. The electronic device of claim 11, wherein the at least one processor is further configured to execute the one or more instructions to determine as zero point coordinates of a weight, from among the plurality of weights, corresponding to a center point of the first sharpening kernel.

14. The electronic device of claim 11, wherein the at least one processor is further configured to execute the one or more instructions to obtain an augmented first sharpening kernel including new weights by performing interpolation between adjacent weights among the plurality of weights in the first sharpening kernel.

15. The electronic device of claim 14, wherein the at least one processor is further configured to execute the one or more instructions to determine the coordinates corresponding to the first weights from among the new weights in the augmented first sharpening kernel.

16. The electronic device of claim 15, wherein the at least one processor is further configured to execute the one or more instructions to:
  obtain a third sharpening kernel by selecting second weights in the augmented first sharpening kernel;
  obtain a fourth sharpening kernel by selecting third weights from the augmented first sharpening kernel at certain intervals; and
  determine the coordinates corresponding to the first weights indicating the representative values of the first sharpening kernel, based on a comparison of a result of applying the third sharpening kernel to the image with a result of applying the fourth sharpening kernel to the image.

17. The electronic device of claim 15, wherein the at least one processor is further configured to execute the one or more instructions to, based on one or more of the new weights being included in the first weights indicating the representative values of the first sharpening kernel, generate pixels corresponding to the one or more of the new weights by performing interpolation on the pixels in the image.

18. The electronic device of claim 11, wherein the at least one processor is further configured to execute the one or more instructions to:
  apply a high pass filter to the first sharpening kernel; and
  determine, based on absolute values of the first sharpening kernel and absolute values of the first sharpening kernel to which the high pass filter is applied, the coordinates corresponding to the first weights indicating the representative values of the first sharpening kernel.

19. The electronic device of claim 18, wherein the first weights in the second sharpening kernel are weights at positions symmetric with respect to a center point of the second sharpening kernel, and
  a maximum value among the first weights in the second sharpening kernel is located at the center point of the second sharpening kernel.

20. A non-transitory computer-readable recording medium having recorded thereon a program that is executable by at least one process to perform the method of claim 1.

* * * * *